(12) United States Patent
Yoshikawa

(10) Patent No.: US 12,280,498 B2
(45) Date of Patent: Apr. 22, 2025

(54) REMOTE CONTROL SYSTEM

(71) Applicant: Honda Motor Co., Ltd., Tokyo (JP)

(72) Inventor: Taizo Yoshikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 311 days.

(21) Appl. No.: 18/169,217

(22) Filed: Feb. 15, 2023

(65) Prior Publication Data
US 2023/0286139 A1 Sep. 14, 2023

(30) Foreign Application Priority Data

Mar. 8, 2022 (JP) ................................ 2022-035677

(51) Int. Cl.
| | | |
|---|---|---|
| B25J 3/00 | (2006.01) | |
| B25J 9/16 | (2006.01) | |
| B25J 13/02 | (2006.01) | |
| B25J 15/00 | (2006.01) | |

(52) U.S. Cl.
CPC ........... B25J 9/1612 (2013.01); B25J 9/1607 (2013.01); B25J 9/1689 (2013.01); B25J 9/1692 (2013.01); B25J 13/02 (2013.01); B25J 15/0009 (2013.01)

(58) Field of Classification Search
CPC ...... B25J 9/1612; B25J 9/1607; B25J 9/1692; B25J 9/1689; B25J 13/02; B25J 15/0009; G05B 2219/41405
See application file for complete search history.

(56) References Cited

U.S. PATENT DOCUMENTS

| | | | | |
|---|---|---|---|---|
| 9,582,077 | B2 * | 2/2017 | Rosenberg | ............ A63F 13/533 |
| 10,246,069 | B2 * | 4/2019 | Eck | ........................ B60K 35/80 |
| 11,325,029 | B2 * | 5/2022 | Nakamura | ............ A63F 13/218 |
| 11,596,858 | B2 * | 3/2023 | Yamano | ................ G06F 3/0346 |
| 12,130,630 | B2 * | 10/2024 | Kasuya | .................. G05D 1/241 |

FOREIGN PATENT DOCUMENTS

| | | |
|---|---|---|
| JP | 2006167867 | 6/2006 |
| JP | 2020163511 | 10/2020 |

OTHER PUBLICATIONS

Thomas Feix et al., "The GRASP Taxonomy of Human Grasp Types", IEEE Transactions on Human-Machine Systems, vol. 46, Issue 1, Feb. 2016, pp. 66-77.

* cited by examiner

*Primary Examiner* — Dalena Tran
(74) *Attorney, Agent, or Firm* — JCIPRNET

(57) ABSTRACT

A remote control system includes: a coordinate origin setting part for setting coordinate origins of an operator and an end effector; an operator joint angle information acquisition part for acquiring information on a joint angle of a finger of the operator; an operator finger length measurement part for measuring a length of each link of the finger of the operator; an operator fingertip position calculation part for calculating a tip position of each finger of the operator viewed from a local coordinate origin of an operator model to be a fingertip position of the operator from information acquired by the operator joint angle information acquisition part and the operator finger length measurement part; and an end effector joint angle derivation part for deriving a joint angle of the end effector from the fingertip position of the operator and a local coordinate origin of the end effector by inverse kinematics.

20 Claims, 24 Drawing Sheets

| Name | First link | Second link | Third link |
|---|---|---|---|
| Thumb | 0.0444 | 0.0378 | 0.0291 |
| Index finger | 0.045 | 0.0273 | 0.0242 |
| Middle finger | 0.0511 | 0.0318 | 0.0276 |
| Ring finger | 0.0493 | 0.0312 | 0.0275 |
| Little finger | 0.0368 | 0.0241 | 0.023 |

FIG. 3

REMOTE CONTROL SYSTEM

CROSS-REFERENCE TO RELATED APPLICATION

This application claims the priority benefit of Japan application serial no. 2022-035677, filed on Mar. 8, 2022. The entirety of the above-mentioned patent application is hereby incorporated by reference herein and made a part of this specification.

BACKGROUND

Technical Field

The disclosure relates to a remote control system.

Related Art

In multi-fingered hand control, conventionally, in the case of a task-executing robot such as an industrial robot, the position of the object operated by the end effector is often fixed, and there are many types that design and execute operations according to the determined task at each joint level (see Patent Literature 1, for example). In the case of a robot that recognizes the position of the object from the camera image and corrects the position of the hand according to the situation, a robot that is not limited by the environment, and a robot that requires detailed balance control such as a walking robot, inverse kinematics (IK) requires calculation of the angle of each joint required to control the end effector to that position with respect to the position of the end effector viewed from the origin position.

In addition, when assuming contact with the environment and physical interaction with humans, such as a humanoid robot, it is desirable to perform torque control of each joint, and in this case, it is necessary to calculate the position of the end effector and the value of the force generated on the end effector as the torque command value for each joint by IK using the Jacobian matrix.

When controlling a robot by IK or inverse dynamics (ID), there is a problem that the load of calculation processing time becomes larger than when directly designing the operations of each joint. Moreover, in the case of a multi joint type robot, the calculation processing becomes even heavier, and there is also the problem that the posture cannot be determined due to the problem of singularities and redundant degrees of freedom. Since humanoid robots and multi-fingered hands have more joints than industrial robots, calculation time is one of the issues in implementation. In the case of a humanoid robot, the base is not fixed, but the waist position of the robot may be considered to be the origin of the robot's local coordinate system when viewed from the global coordinate system. Geometrically, it may be calculated as a branched structure configured by five branches including the head, right arm, left arm, right leg, and left leg, with the waist part as the origin.

Further, in the case of multi-fingered hand control, it may be considered to be a branched structure similar to that of a humanoid robot. In the case of multi-fingered hand control, with the wrist position as the origin of the local coordinate system, it may be calculated as a geometric structure configured by five finger branches (thumb, index finger, middle finger, ring finger, and little finger), with the tip of each finger as an end effector. When controlling the tip position of each finger, for example, when controlling the position of the index finger in space, calculating IK as a contiguous geometric structure configured by Fingertip-3Y-2Y-1Y-1Z plus Wrist (XYZ)+Elbow (Y)+Shoulder (XYZ) is computationally wasteful, and at the same time, it is conceivable that the IK solution cannot be obtained. In this case, after controlling the wrist position on the arm side, it is desirable to obtain the joint angle of each finger by IK from the position of each finger, with the wrist position as the local origin of the multi-fingered hand.

In addition, in the conventional direct remote control of a multi-fingered hand, for example, a framework is configured in which the posture angles of the operator's fingers are estimated using a data glove, and the detected angle information of each joint is commanded as the angle command value of each joint of the robot (see Patent Literature 2, for example). If the positions of human joints, the rotation axis configuration, the link length of each finger, and the configuration of the robot are the same, even if the robot hand is moved based on each joint angle information of the human, the position of the fingertips remains the same as that of a human.

CITATION LIST

Patent Literature

[Patent Literature 1] Japanese Patent Application Laid-Open No. 2020-163511
[Patent Literature 2] Japanese Patent Application Laid-Open No. 2006-167867

However, in the case of remote operation, the finger structures of the actual operator and the robot differ, and at the same time, the finger size of each operator also differs. Further, when detecting the posture (joint angle) of a person's fingers, a glove-type device used in virtual reality (VR) is often used; however, there is no device that can detect human joint angles as accurately as 20 degrees of freedom (DOF). For this reason, even if a person instructs the robot to take the pinch posture with the index finger and the thumb, there is a problem that the posture is not detected well, and even if the posture is detected, the robot does not take the pinch posture in the same way. As described above, in the conventional technology, it is difficult to perform detailed fingertip remote control in direct remote control.

In view of the above, the disclosure provides a remote control system that enables detailed fingertip remote control and also enables intuitive control.

SUMMARY (1) In view of the above, a remote control system according to an embodiment of the disclosure is a remote control system in which an operator remotely operates an end effector including a finger. The remote control system includes: a coordinate origin setting part for setting coordinate origins of the operator and the end effector; an operator joint angle information acquisition part for acquiring information on a joint angle of a finger of the operator; an operator finger length measurement part for measuring a length of each link of the finger of the operator; an operator fingertip position calculation part for calculating a tip position of each finger of the operator viewed from a local coordinate origin of an operator model to be a fingertip position of the operator from information acquired by the operator joint angle information acquisition part and the operator finger length measurement part; and an end effector joint angle derivation part for deriving a joint angle of the finger of the end effector from the fingertip position of the operator and a local coordinate origin of the end effector by inverse kinematics.

BRIEF DESCRIPTION OF THE DRAWINGS

FIG. 3 is a diagram showing an example of actually measured finger sizes of an operator.

Figure 1:
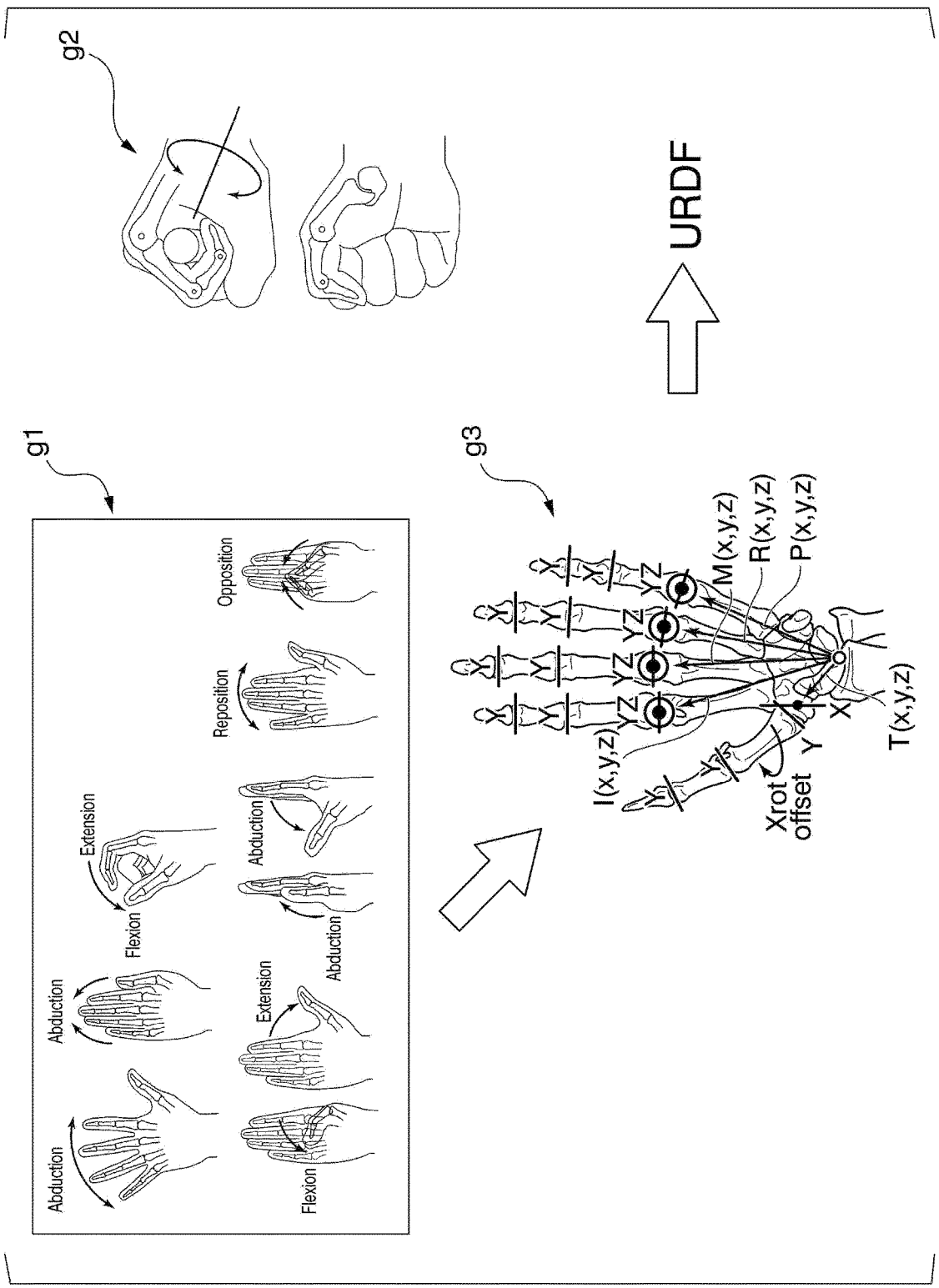
FIG. 1 is a diagram for illustrating modeling of a geometric structure of an operator's joint positions and link lengths in the first processing according to an embodiment.

DESCRIPTION OF THE EMBODIMENTS (2) Further, in the remote control system according to an embodiment of the disclosure, the operator finger length measurement part may model a geometric structure of a joint position and a link length of the operator, and may measure the joint position and a length of each link of the finger of the operator with a length of a first link of one of five fingers of the operator as a reference.

(3) Further, in the remote control system according to an embodiment of the disclosure, the end effector joint angle derivation part may create a command value for a second joint of the finger of the end effector based on the measured length of each link of the operator and the calculated fingertip position of the operator.

(4) Further, the remote control system according to an embodiment of the disclosure may further include a position correction part which measures a positional difference between a center point of a fingertip of the operator and a center point of the finger of the end effector and corrects the tip position of each finger viewed from the local coordinate origin of the operator model as an offset of a fingertip position command.

(5) Further, the remote control system according to an embodiment of the disclosure may further include a position correction part which measures a positional difference between a target point of the fingertip of the operator and a fingertip of a model of a hand of the operator and corrects the tip position of each finger viewed from the local coordinate origin of the operator model as an offset of a fingertip position command.

(6) Further, the remote control system according to an embodiment of the disclosure may further include a position correction part which measures a positional difference between a target point of the fingertip of the operator and a target point of the finger of the end effector and corrects the tip position of each finger viewed from the local coordinate origin of the operator model as an offset of a fingertip position command.

In the case of the pinch operation of the thumb and forefinger, the center point of the two fingertip positions may be set as the target position. Further, the center point of the front positions of two end effectors may be set as the target position.

(7) Further, the remote control system according to an embodiment of the disclosure may further include a mode for deriving the joint angle of the end effector; and a mode selection part capable of estimating a posture of a hand of the operator based on sensor information of a robot equipped with the end effector and selecting a mode for moving the robot for each finger.

(8) Further, in the remote control system according to an embodiment of the disclosure, the mode selection part may switch modes according to a taxonomy, or may switch modes according to a speed of the fingertip of the operator.

According to (1) to (8), it is possible to perform detailed fingertip remote operation and also to perform intuitive operation.

Hereinafter, embodiments of the disclosure will be described with reference to the drawings. In addition, in the drawings used for the following description, the scale of each member is appropriately changed so that each member has a recognizable size.

In addition, in all the drawings for illustrating the embodiments, the same reference numerals are used for the parts having the same functions, and repeated descriptions are omitted. In addition, the phrase "based on X" in the disclosure means "based on at least XX," and includes cases of being based on other elements in addition to X. Moreover, the phrase "based on X" is not limited to the case of using X directly, but also includes the case of being based on what has been calculated or processed with respect to X. "X" is an arbitrary element (for example, arbitrary information).

Overview

First, an outline of the embodiments will be described.
In this embodiment, the positions of the fingertips of the human and the robot are matched, and at the same time, an intuitive operation is enabled. For this reason, in this embodiment, as the first processing, the finger size is measured for each operator, a geometric model is built, and the sensor value of the data glove is used to calculate the fingertip positions by forward kinematics (FK). In the first processing, the geometric structure of the operator's joint positions and link lengths is modeled, and then a system for measuring the joint positions and link lengths of each operator is built. Further, in the second processing, the FK fingertip position is used as a command value for the robot, and the joint angle of the end effector 1 is derived by, for example, inverse kinematics (IK).

First Processing

First, the first processing will be described. FIG. 1 is a diagram for illustrating modeling of a geometric structure of an operator's joint positions and link lengths in the first processing according to this embodiment. Images g1 and g2 show patterns of thumb movement. Image g3 shows the axial configuration. In the model, YZ is defined as the first joint, and Y is defined as the second and third joints of the index finger, the middle finger, the ring finger, and the little finger, respectively, as in image g3. Further, for example, the wrist joint is defined as the reference point X. As for the thumb, Y is defined as the CM joint between the first metacarpal bone and the hand, the MP joint between the first metacarpal bone and the proximal phalanx, and the IP joint between the proximal phalanx and the distal phalanx. Further, the thumb has a joint structure capable of opposition.

Figure 2:
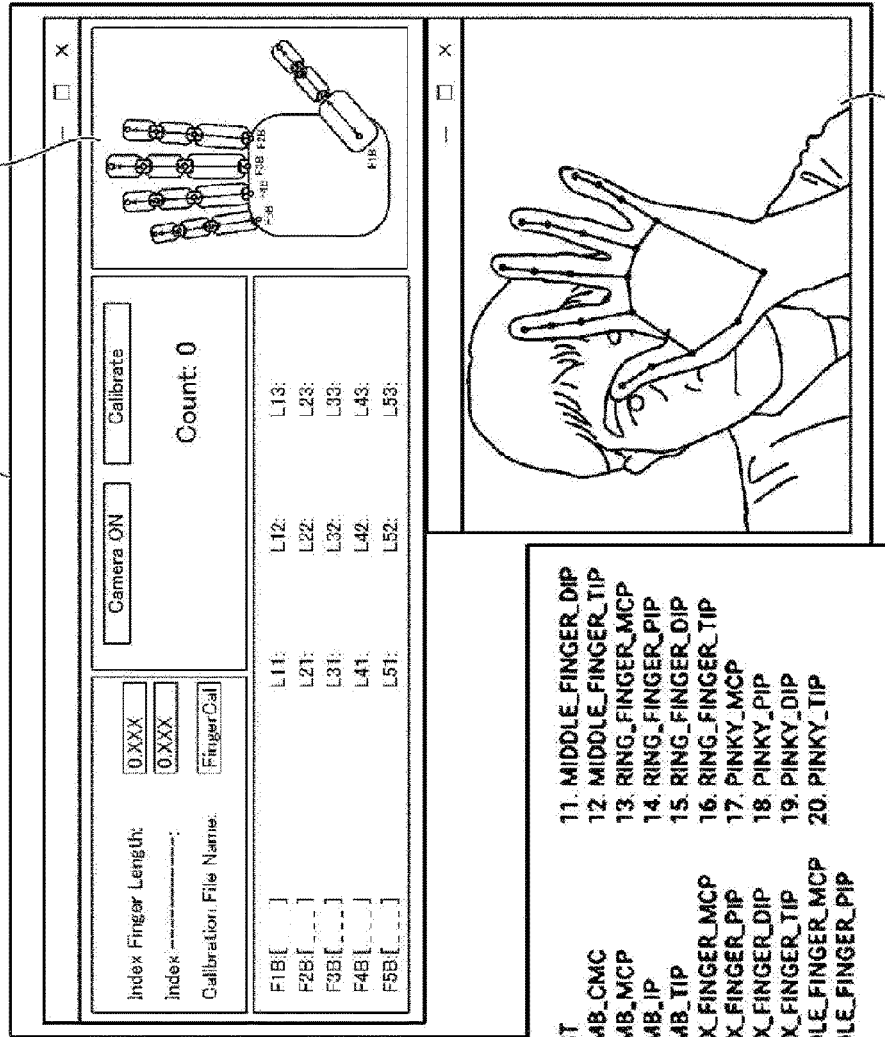
FIG. 2 is a diagram showing an example of a system for measuring the finger size for each operator according to the embodiment.

FIG. 2 is a diagram showing an example of a system for measuring the finger size for each operator according to this embodiment. Image g11 is an example in which numbers and names are given to the joints of the hand and fingers. In the example, the reference point number is 0. Image g13 is a model of a hand and fingers, and images g12 and g14 are examples of images during actual measurement. In the actual measurement, the operator holds his or her hand toward the camera, for example.

Since the finger size of a person differs from person to person, even if a person's fingertip position is calculated based on the angle of each finger joint acquired by the data glove worn by the operator performing remote control, the position differs from person to person.

In this regard, in this embodiment, a system for measuring the size of the operator's finger fits the captured image to the model and measures the size of each part. In this embodiment, for example, a captured image is measured using a model subjected to image processing and machine learning. In addition, in the measurement, the reference length is, for example, the length of the first link of the index finger as described later. In addition, the reference length may be the first link of another finger. Moreover, the measurement may be performed multiple times and the average may be acquired, or noise may be excluded. FIG. 3 is a diagram showing an example of actually measured finger sizes of an operator.

Calculation of Fingertip Position

Next, calculation of the fingertip position will be described.

Figure 4:
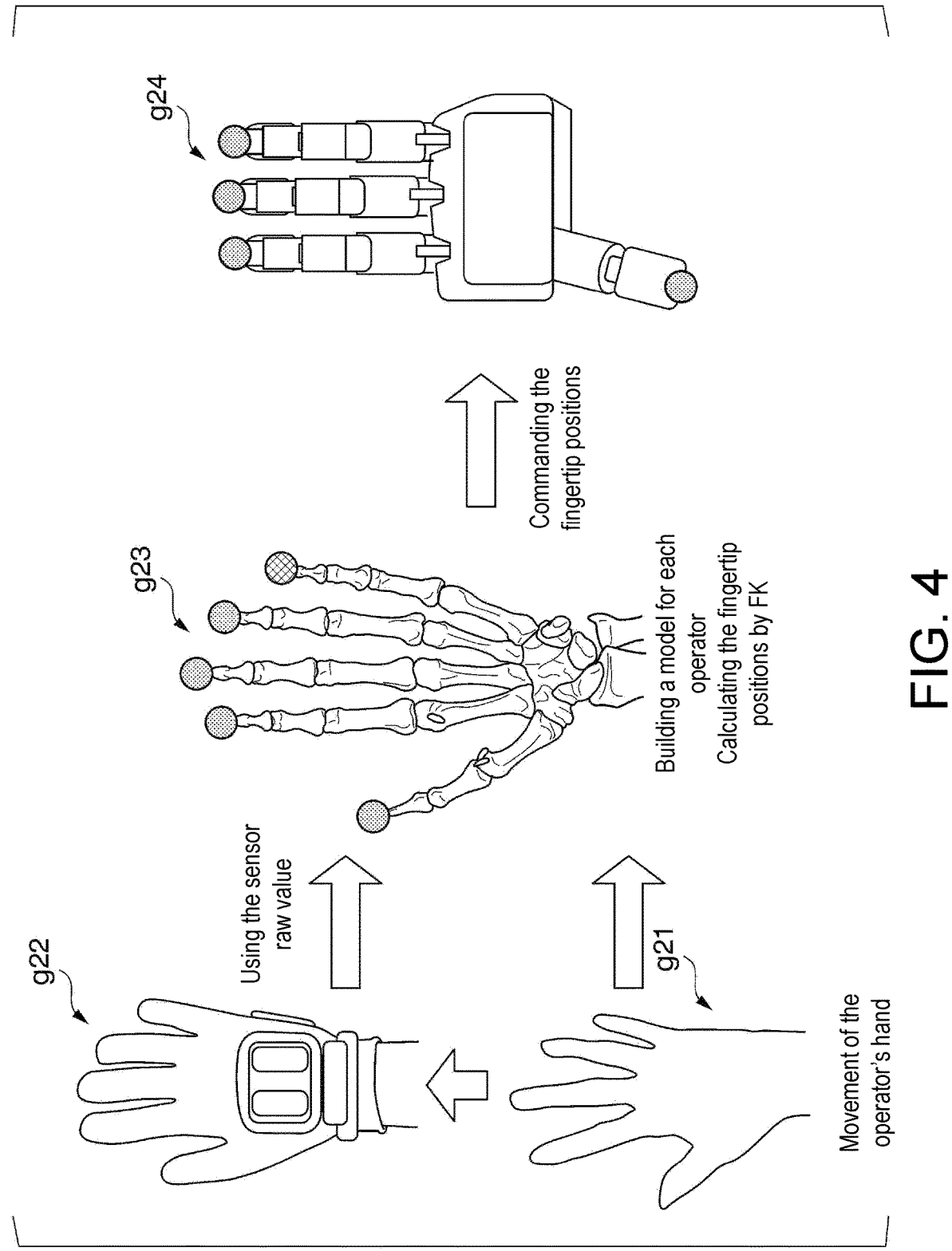
FIG. 4 is a diagram for illustrating calculation of fingertip positions according to the embodiment.

FIG. 4 is a diagram for illustrating calculation of fingertip positions according to this embodiment. In this embodiment, a model of the operator's hand is built (g21), the operator wears a data glove on the hand, and the sensor value detected by the sensor of the data glove is used (g22) to calculate the operator's fingertip positions by FK (g23). Then, in this embodiment, the operator's hand model and fingertip position commands are output to the end effector 1 (g24).

Figure 5:
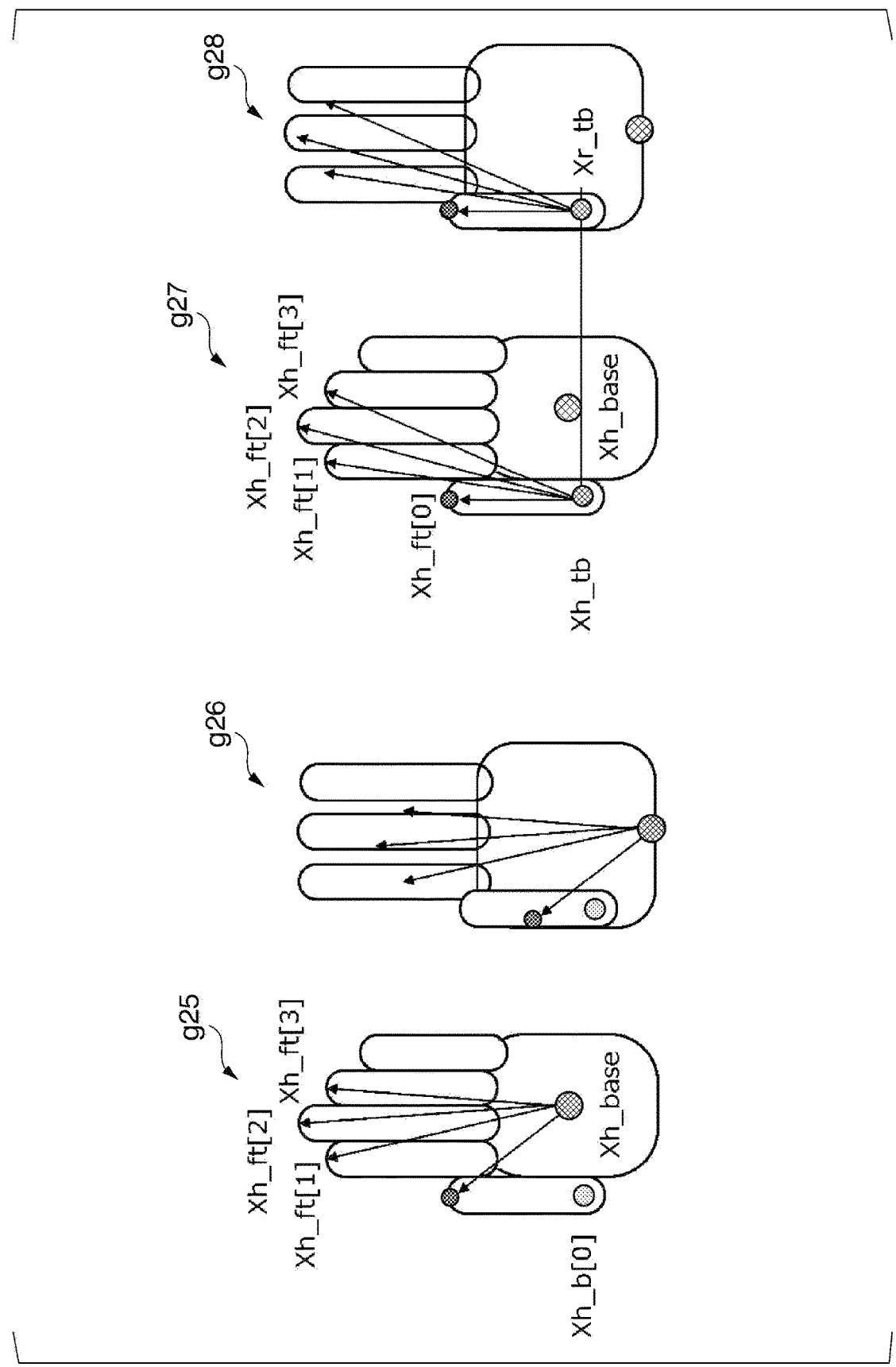
FIG. 5 is a diagram for illustrating an example of matching between a human hand model, a robot hand model, and positions.

In the calculation of the fingertip positions, by matching the common parts of the operator's hand model and the robot's hand model, the fingertip position commands of the operator's hand model and the robot's model are matched. For example, as shown in images g27 and g28 in FIG. 5, the base parts of the thumbs may be matched. FIG. 5 is a diagram for illustrating an example of matching between a human hand model, a robot hand model, and positions.

Image g25 is an example of a human hand model, and is an example of calculating the fingertip positions from the hand coordinate origin.

Image g26 is an example of a robot hand model, and shows a case where the fingertip positions of the human hand model are indicated from the origin of the robot hand model.

Image g27 is an example of a human hand model, and is an example of calculating the fingertip positions from the base of the thumb.

Image g28 is an example of a robot hand model, and is an example of first matching the thumb base positions of the human hand model and the robot hand model, and then indicating the fingertip position of the thumb origin of the human hand model from the thumb base of the robot hand model.

In addition, in FIG. 5, Xh_ft[n]=Xh_ft[n]−Xh_tb+Xr_tb (n=0, 1, 2, 3).

Derivation of Joint Angle of End Effector

Figure 6:
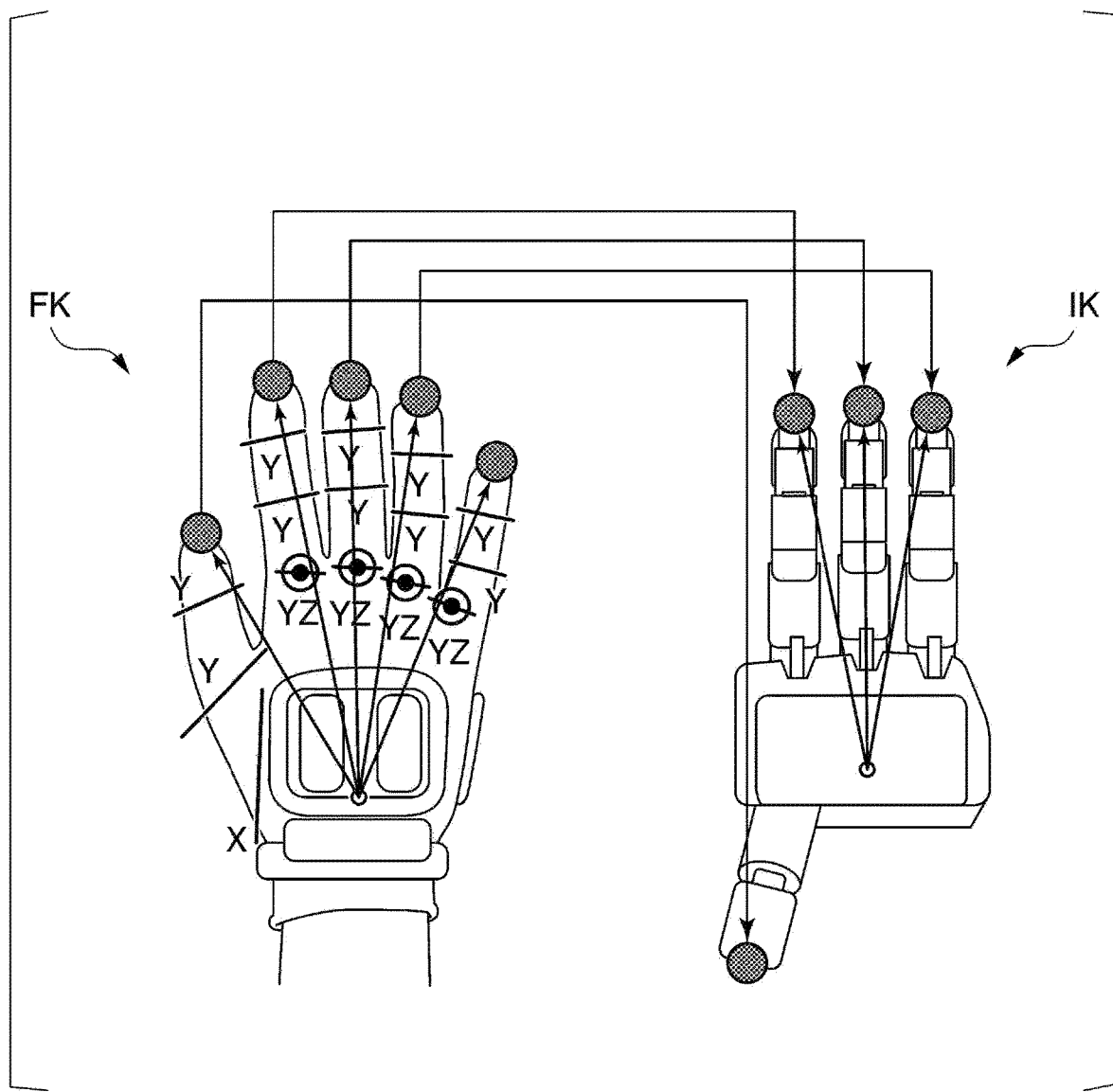
FIG. 6 is a diagram for illustrating derivation of a joint angle of the end effector by IK according to the embodiment.

In this embodiment, the FK fingertip position is used as a command value for the robot, and the joint angle of the end effector 1 is derived by IK. That is, as shown in FIG. 6, the FK fingertip position is used as a command value for the fingertip position of the end effector 1. FIG. 6 is a diagram for illustrating derivation of a joint angle of the end effector 1 by IK according to this embodiment.

In this embodiment, the joint angle is derived using the pseudo inverse matrix J+ as in the following equations (1) to (3).

$$\delta x = J \delta q \dot{x} = J \dot{q} \qquad \text{[Equation 1]}$$

$$\delta \dot{q} = J^+ \delta x + (I - J^+) \xi$$

$$\dot{x} \geq \delta x \qquad \text{[Equation 2]}$$

$$J^+ \in R^{n \times m}$$

$$\text{rank}(J) = m$$

$$J^+ = J^T (JJ^T)^{-1} \qquad \text{[Equation 3]}$$

In equation (1), x·(≥δx) is the amount of change between the current fingertip position and the next fingertip position command; q·(≥δq) is the amount of change in each joint angle for moving to the next fingertip position command position; and J is a transformation matrix for transforming the amount of change in the hand position when each joint is slightly moved. In equation (2), I is the identity matrix, and ξ is the weight (sensitivity). In equation (3), n is the degree of freedom of the joint, and m is the degree of freedom of the task.

Using Taxonomy

In addition, in this embodiment, the following A and B are performed in order to be able to select for each finger the sensor value of the data glove, the intuitive joint angle command based on the model of the operator's hand, and the position command based on the IK of the end effector 1. In addition, the following switching is performed by a selection part 212, which will be described later.

A. Switching Modes According to Taxonomy (See Reference 1)

Figure 7:
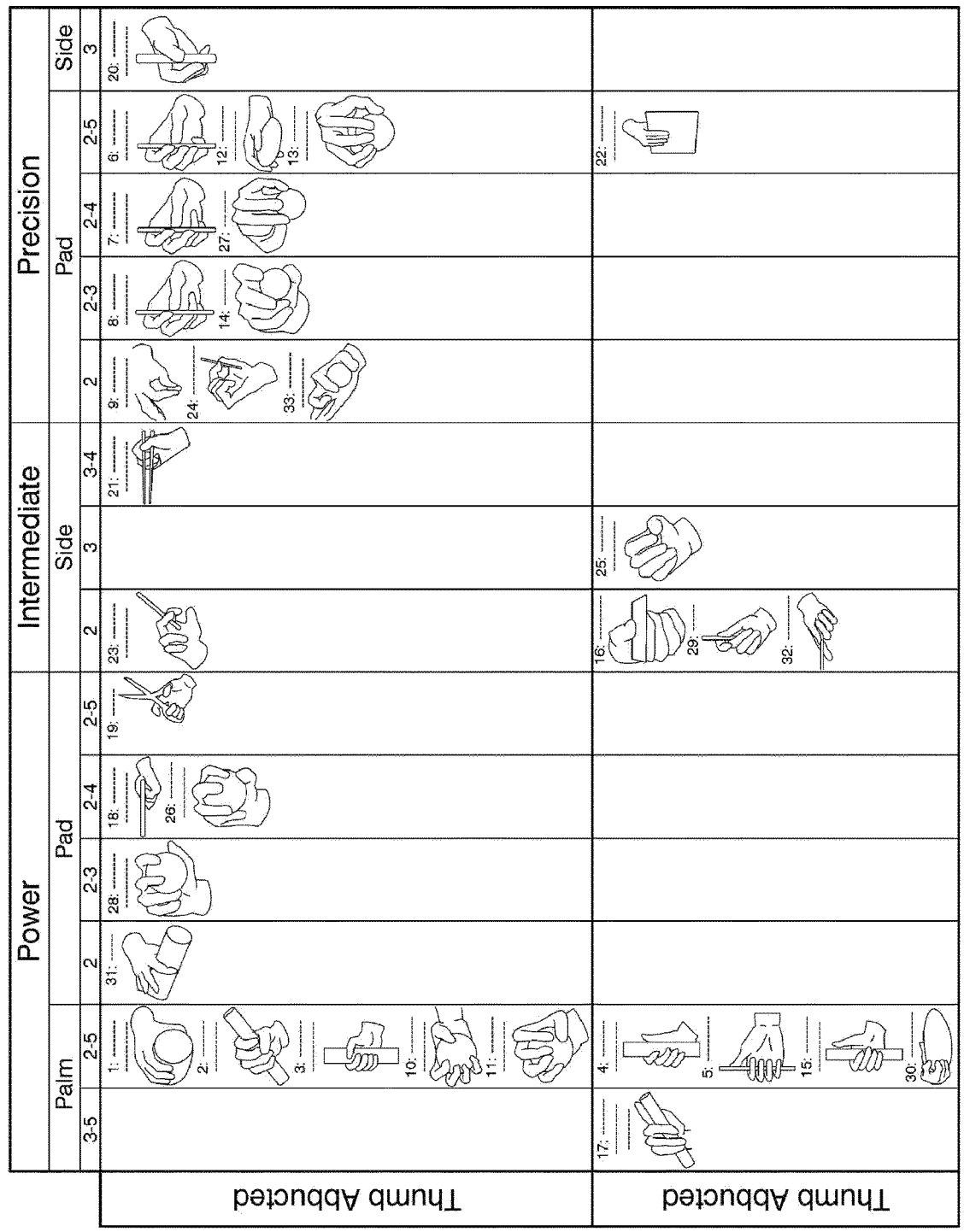
FIG. 7 is a diagram showing an example of taxonomy.

FIG. 7 is a diagram showing an example of taxonomy. In this embodiment, a mode IK in which joint angles are calculated and commanded by IK as in taxonomies I to VII below and a mode DEV in which commands are issued based on device sensor information are used. In I to VII, T is the thumb, I is the index finger, M is the middle finger, and R is the ring finger.

I. Medium Wrap: T[IK], I[DEV], M[DEV], R[DEV]
II. Power Disk: T[IK], I[IK], M[IK], R[DEV]
III. Prizmatic 3: T[DEV], I[IK], M[IK], R[DEV]
IV. Prizmatic 2: T[DEV], I[IK], M[DEV], R[DEV]
V. Palmar Pinch: T[IK], I[IK], M[DEV], R[DEV]
VI. Tripod: T[IK], I[IK], M[IK], R[DEV]
VII. Ratchet wrench: T[IK], I[DEV], M[DEV], R[DEV]

Reference 1: Thomas Feix, Javier Romero, et al., "The GRASP Taxonomy of Human Grasp Types" IEEE Transactions on Human-Machine Systems (Volume: 46, Issue: 1, February 2016), IEEE, p 66-77.

B. Switching Modes According to Fingertip Speed

Further, in this embodiment, IK and DEV are used under the following conditions.

If (fingertip speed>threshold): Mode DEV commanded by device sensor information
Else: Mode IK that calculates and commands the joint angle by IK

Use of Command Values of the Second Joint of the Finger of the End Effector

Figure 8:
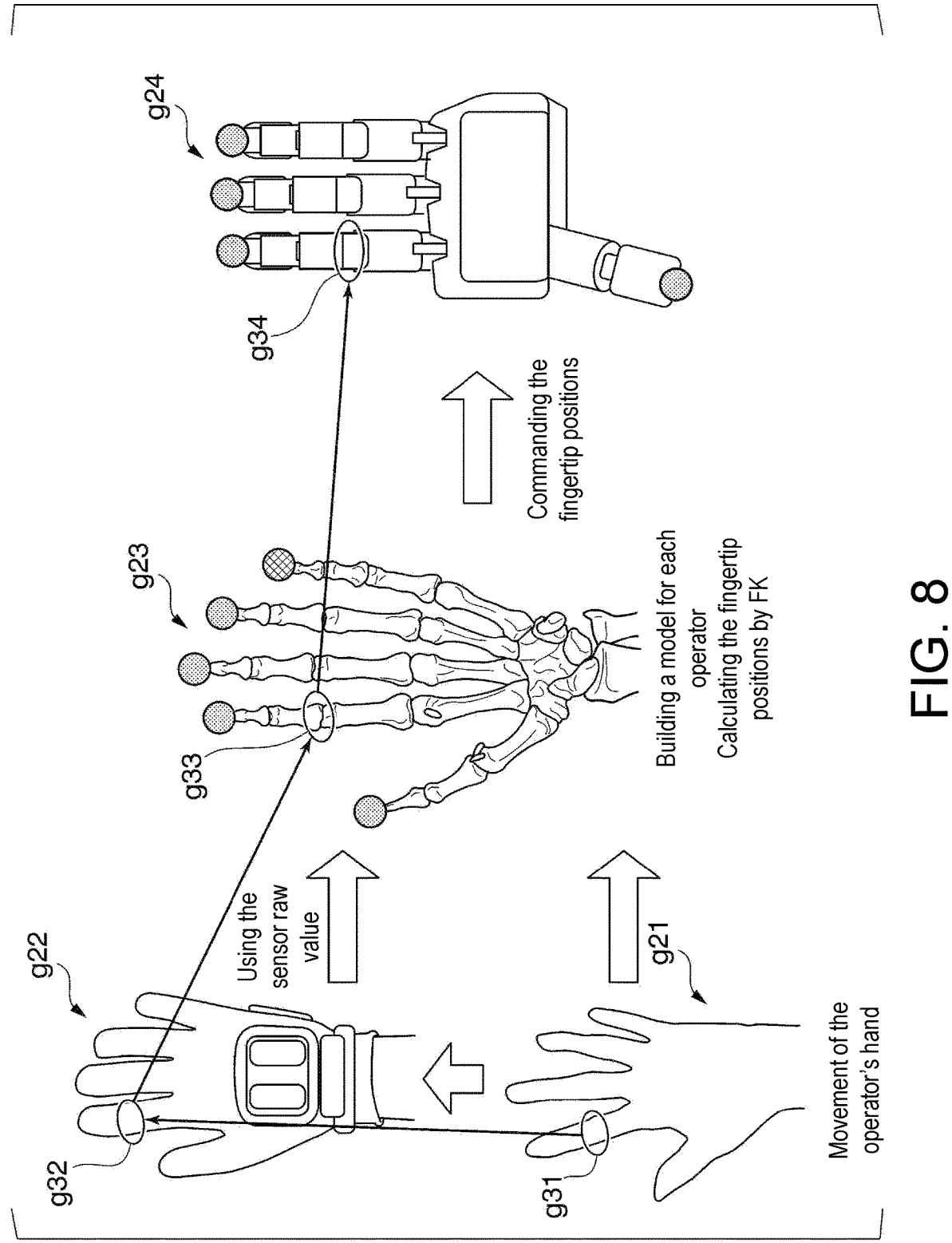
FIG. 8 is a diagram for illustrating the use of command values of the second joint of the finger of the end effector.

In this embodiment, as shown in FIG. 8, in the position command mode by IK of the end effector 1, intuitive operation is made possible by using the command value acquired by "measuring the finger size of each operator, building a geometric model, and calculating the fingertip position by FK using the sensor value of the data glove" (g31 to g34). FIG. 8 is a diagram for illustrating the use of command values of the second joint of the finger of the end effector.

In this embodiment, in the IK convergence calculation, intuitive operability is improved by giving a value that may be acquired from the sensor as a constraint condition for the value of the second joint. Since the answer is given in advance in this manner, the convergence operation is also expected to be faster according to this embodiment.

Realization of Pinch Operation

Figure 9:
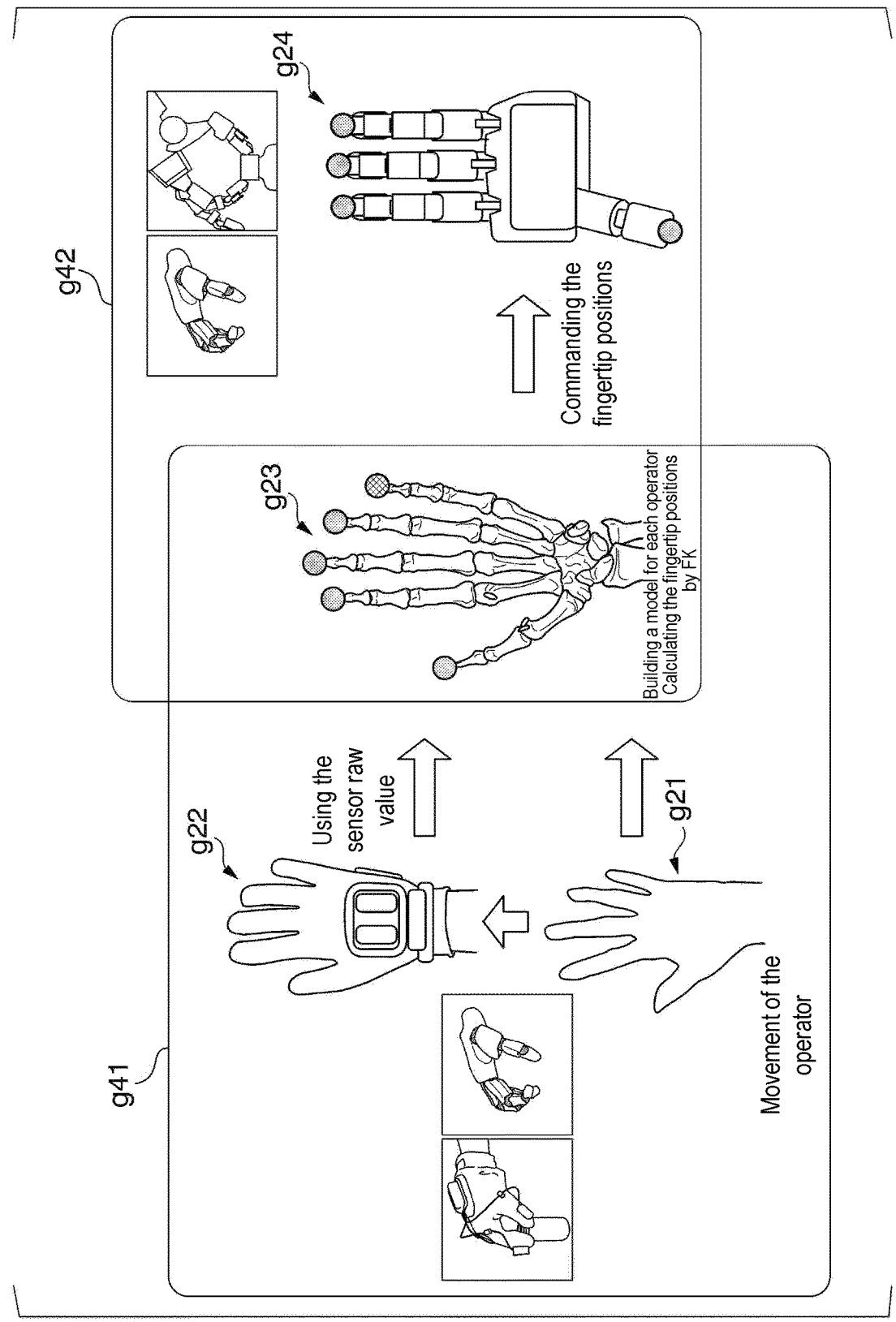
FIG. 9 is a diagram for illustrating the realization of a pinch operation.

Further, in this embodiment, the following calibration is performed in order to enable the pinch operation with the thumb, index finger, and middle finger. FIG. 9 is a diagram for illustrating the realization of a pinch operation.

A. Calibration of the offset of the fingertip position between the person's actual finger posture and the model in which "the finger size is measured for each operator, a geometric model is built, and the fingertip position is calculated by FK using the sensor value of the data glove" (image g41 in FIG. 9).

B. Calibration of the offset of the fingertip position between the built geometric model and the end effector 1 (g42)

Calibration of Human Posture and Human Model Posture Using Data Glove

Figure 10:
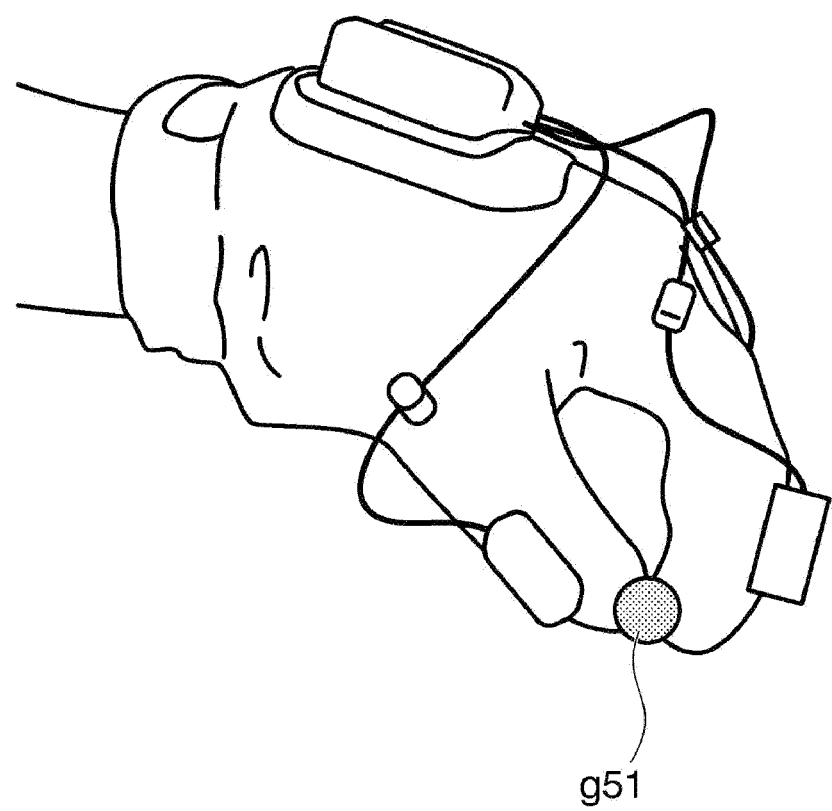
FIG. 10 is a diagram for illustrating calibration of a human posture and a human model posture using a data glove.
Figure 11:
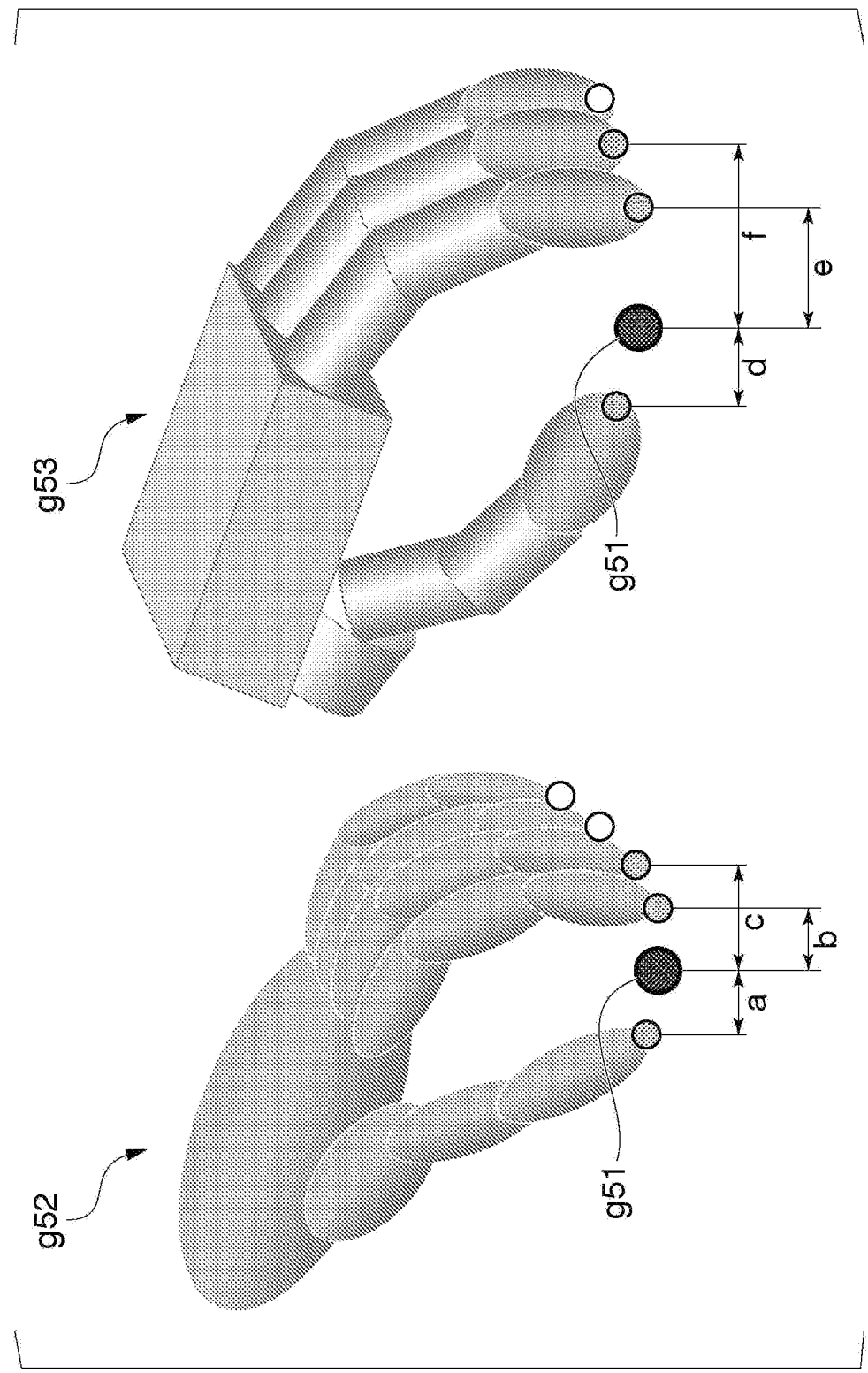
FIG. 11 is a diagram for illustrating calibration of a human posture and a human model posture using a data glove.

Next, calibration of a human posture and a human model posture using a data glove will be described. FIG. 10 and FIG. 11 are diagrams for illustrating calibration of a human posture and a human model posture using a data glove.

FIG. 10 is an example of a pinch posture by an actual operator. Circle g51 is a common target position. The common target position for the robot is the target position after matching the bases of the thumbs. Although the target position is common, calibration is performed first for the human hand model and then for the robot hand model. That is, calibration is performed separately. The processing cancels each of the offsets.

Calibration will be further described with reference to FIG. 11. In this embodiment, calibration of the posture of the human model using the data glove and calibration of the posture of the robot model are performed separately.

As in image g52, in removing the offset of the human model, the sensor value is offset, and the model is adjusted. The processing removes the offset (a) between the target position and the thumb, the offset (b) between the target position and the index finger, and the offset (c) between the target position and the middle finger in the human model.

As shown in image g53, the offset removal of the robot model removes the offset (d) between the target position and the thumb, the offset (e) between the target position and the index finger, and the offset (f) between the target position and the middle finger.

Here, issues of a general data glove are considered. A general data glove used for remote control has the following issues.

Issue 1. Unable to Take a Posture Facing the Thumb
  Unable to perform the pinch operation smoothly (even if the person's fingers are forced to move to pinch, the fingers may interfere)
  Position calibration problem
Issue 2. Unable to Detect the Posture of the Third Joint
  Interlocked with the second joint (The graph display of the interface provided by the data glove displays only the first and second joints)

In this embodiment, for Issue 1, the pinch posture offset calibration mode is performed locally. In addition, in this embodiment, for Issue 2, the angle of the third joint of the data glove is defined by the interlocking algorithm of the third joint of the end effector 1.

In this embodiment, in order to match the fingertip position estimated by the data glove with the fingertip position of the end effector 1, the joint angle of each finger of the end effector 1 is calculated by IK from each fingertip position of the operator.

Figure 12:
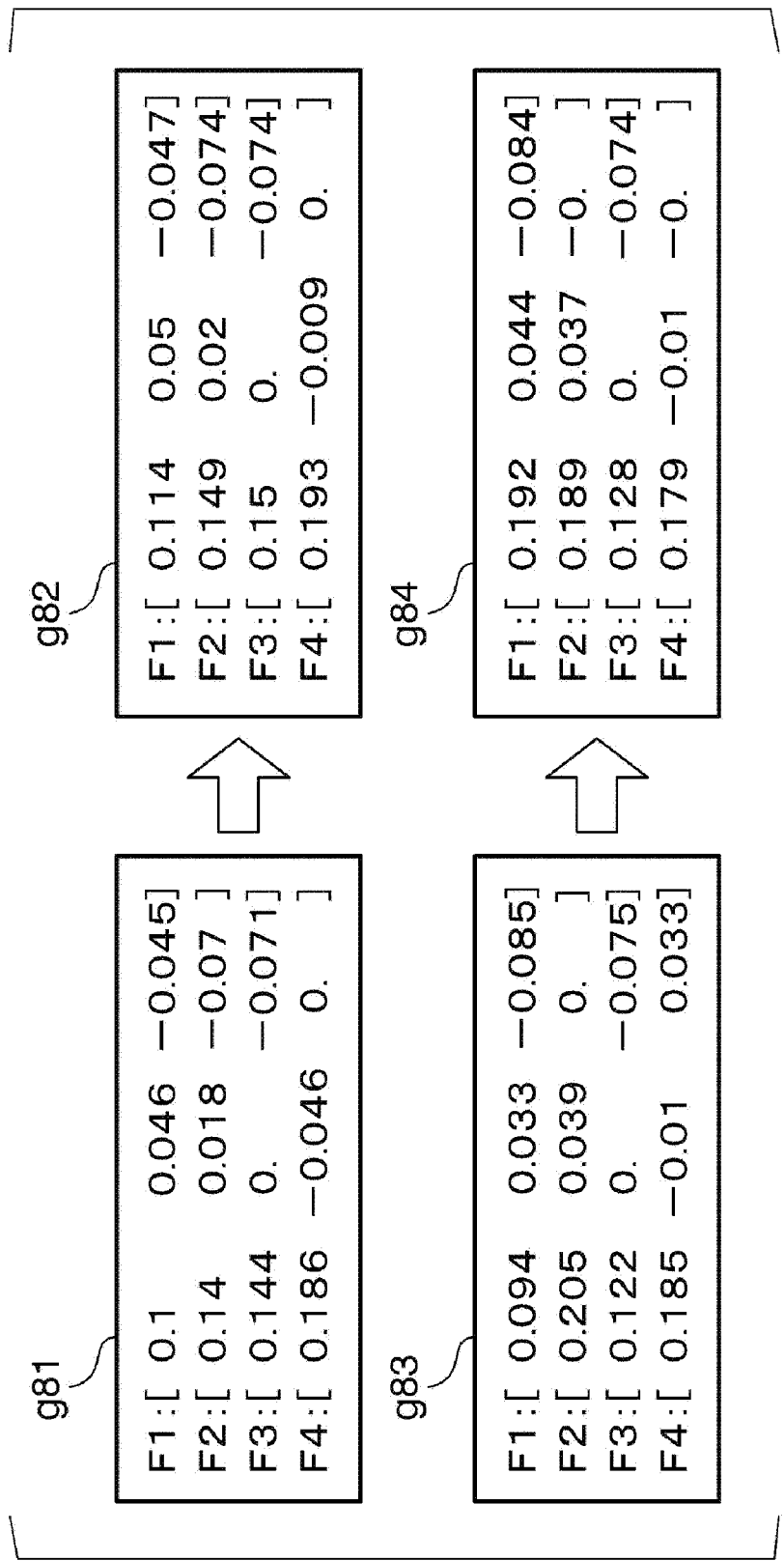
FIG. 12 is a diagram showing an example of verification results by simulation.

FIG. 12 is a diagram showing an example of verification results by simulation. In the simulation, the joint angle of each finger of the robot was calculated by IK from each fingertip position of the user when each joint was moved. In FIG. 12, images g81 and g83 are the post-task positions of the end effector 1 from task commands to IK, IK to FK, and FK to the end effector 1.

Images g82 and g84 are task commands from the operator's joint commands to FK and from FK to the end effector 1.

In this way of such simulation and verification, the allowable range of error was set to 5 mm, and the operation could be confirmed with a similar error.

Configuration Example of End Effector Control Device

Figure 13:
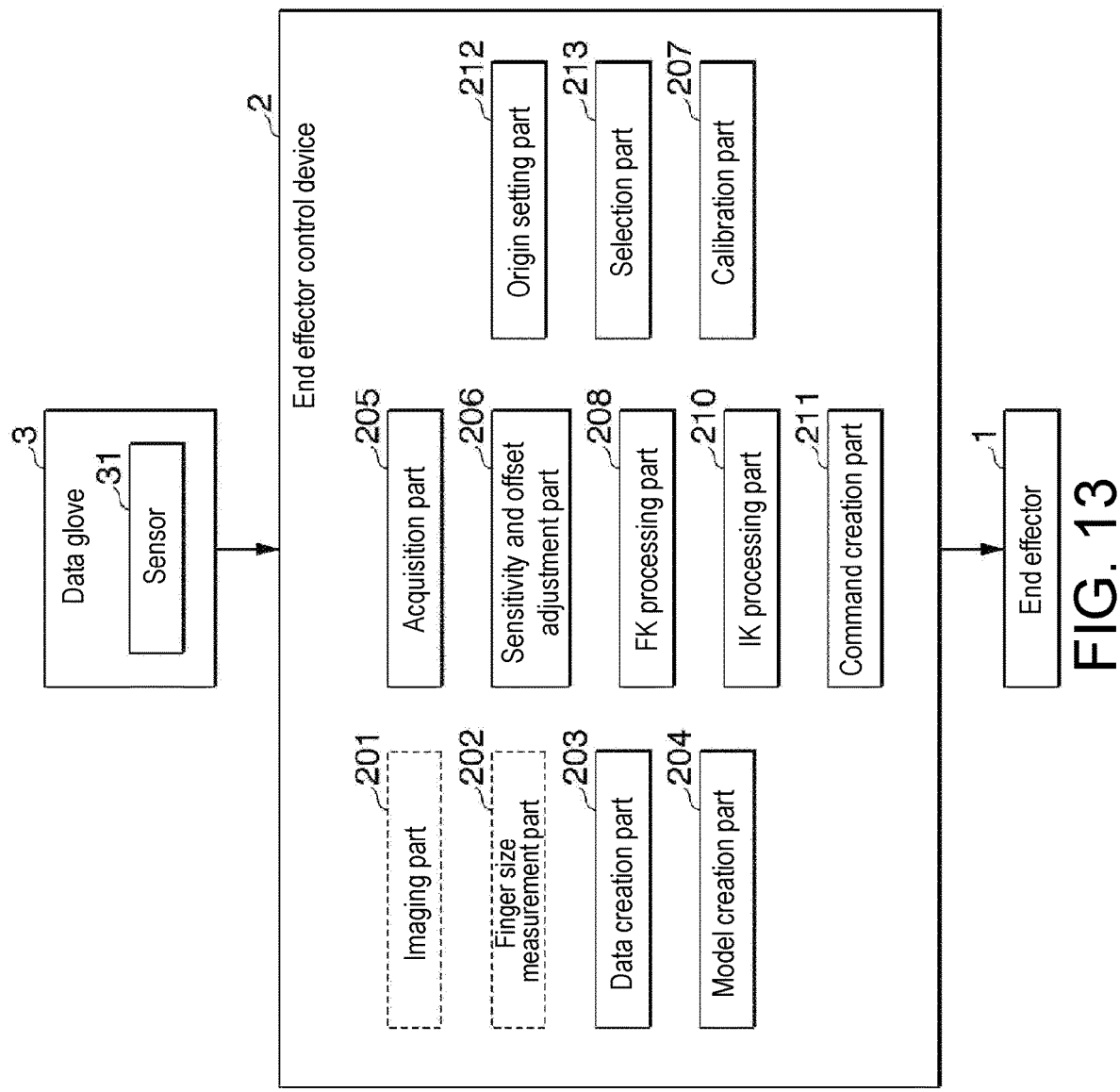
FIG. 13 is a diagram showing a configuration example of an end effector control device according to the embodiment.

Next, a configuration example of an end effector control device 2 will be described. FIG. 13 is a diagram showing a configuration example of an end effector control device according to the embodiment.

As shown in FIG. 13, the end effector control device 2 includes an imaging part 201 (operator finger length measurement part), a finger size measurement part 202 (operator finger length measurement part), a data creation part 203 (operator finger length measurement part), a model creation part 204, an acquisition part 205 (operator joint angle information acquisition part), a sensitivity and offset adjustment part 206, a calibration part 207 (position correction part), an FK processing part 208 (operator fingertip position calculation part), an IK processing part 210 (end effector joint angle derivation part), a command creation part 211, an origin setting part 212 (coordinate origin setting part), and a selection part 213 (mode selection part).

The end effector 1 includes multiple fingers, a force sensor, a position sensor, and the like. A configuration example of the end effector 1 will be described later.

The data glove 3 is a device worn by the operator on the hand when remotely operating the end effector 1. The data glove 3 includes a sensor 31 (operator joint angle information acquisition part) that detects the position and movement of the finger. The sensor 31 is, for example, a 6-axis sensor or the like.

The imaging part 201 is, for example, a charge coupled device (CCD) imaging device, a complementary MOS (CMOS) imaging device, or the like.

As described above, the finger size measuring part 202 measures the size of the operator's finger using image processing and a trained model for the image captured by the imaging part 201. In addition, the imaging part 201 and the finger size measurement part 202 may be external devices. In this case, the finger size measured by the external device may be output to the end effector control device 2.

The data creation part 203 creates the finger size measured by the finger size measurement part 202 as data in the same format as the end effector 1.

The model creation part 204 uses the data created by the data creation part 203 to create a kinematics model.

The acquisition part 205 acquires the sensor value detected by the sensor 31 from the data glove 3 worn by the operator. The acquisition part 205 acquires information on the joint angle of the operator's finger during operation based on the sensor value. In addition, the finger size measurement part 202 may acquire information on the joint angle of the operator's finger during operation.

The sensitivity and offset adjustment part 206 performs sensitivity adjustment and offset adjustment on the sensor value acquired by the acquisition part 205.

The calibration part 207 acquires the average value of the fingertip position of each finger of the operator's hand model. The calibration part 207 acquires the average value of the fingertip position of each finger of the end effector 1. The calibration part 207 calibrates the offset of the fingertip position between the person's actual finger posture and the model. The calibration part 207 calibrates the offset between the model and the fingertip position of the end effector 1.

In addition, the calibration part 207 may measure the positional difference between the target point of the operator's fingertip and the fingertip of the operator's hand model, and may correct the tip position of each finger viewed from the local coordinate origin of the operator model as an offset of the fingertip position command. Further, the calibration part 207 may measure the positional difference between the target point of the operator's fingertip and the target point of the fingertip of the end effector, and may correct the tip position of each finger viewed from the local coordinate origin of the operator model as an offset of the fingertip position command. In the case of the pinch operation of the thumb and forefinger, the center point of the two fingertip positions may be set as the target position. Further, the center point of the front positions of two end effectors may be set as the target position.

The FK processing part 208 obtains the model created by the model creation part 204, and calculates the fingertip position by FK using the values acquired by calibrating the data adjusted by the sensitivity and offset adjustment part 206 by the calibration part 207. In addition, the output of the FK processing part 208 is a command at the fingertip position of the operator's hand model.

The IK processing part 210 uses the fingertip position calculated by the FK processing part 208 as a command value for the robot, and uses the data calibrated by the calibration part 207 to derive the joint angle of the end effector 1 by IK. The output of the IK processing part 210 is an angle command for each finger of the end effector 1.

The command generation part 211 generates a control command for the end effector 1 based on the angle command for each finger of the end effector 1.

The origin setting part 212 sets the coordinate origins (reference points) of the operator and the end effector 1 respectively. The origin setting part 212 sets the coordinate origins of the operator and the end effector 1 based on the data created by the data creation part 203 and known dimensions of the end effector 1, for example.

As will be described later, the selection part 213 selects a mode (retargeting) for deriving the joint angle of the end effector 1 and a mode for estimating the posture of the operator's hand based on sensor information of the robot equipped with the end effector 1 and moving the end effector for each finger.

In addition, the processing procedures and the like of each part will be described later.

Configuration Example of End Effector

Figure 14:
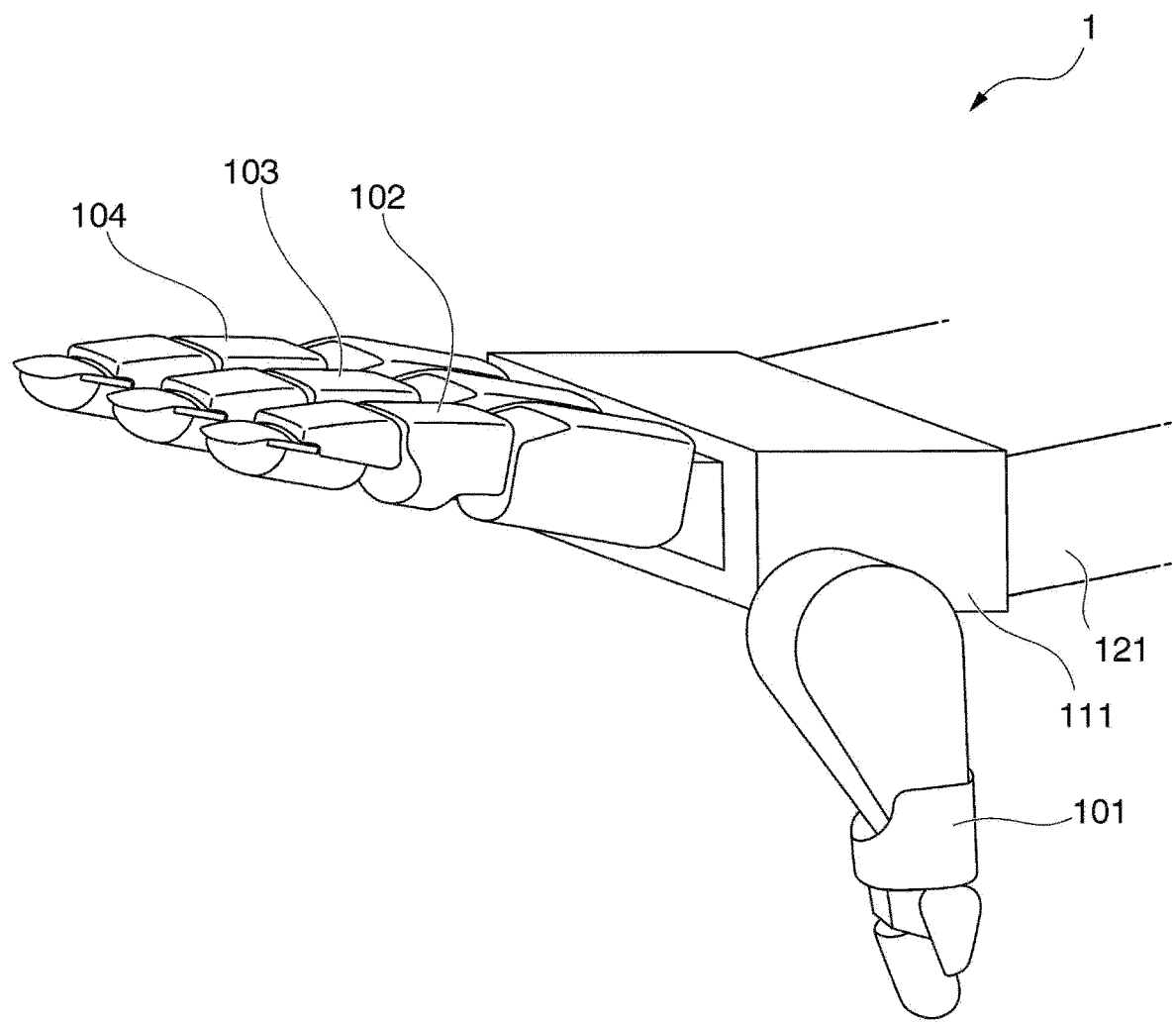
FIG. 14 is a diagram showing a configuration example of an end effector according to the embodiment.

FIG. 14 is a diagram showing a configuration example of an end effector according to this embodiment. Although the end effector 1 shown in FIG. 14 has four fingers as an example, the number of fingers may be two or more.

The end effector 1 includes a finger 101, a finger 102, a finger 103, a finger 104 and a base 111. The end effector 1 is connected to an arm 121 via a joint.

The finger 101 corresponds to, for example, a human thumb. The finger 102 corresponds to, for example, a human index finger. The finger 103 corresponds to, for example, a human middle finger or ring finger. The finger 104 corresponds to, for example, a human ring finger. Each finger includes knuckles and joints. The base 111 includes positions corresponding to the back and palm of a human hand. The fingers 101 to 104 are connected to the base 111.

Processing of Finger Size Measurement and Model Creation

Figure 15:
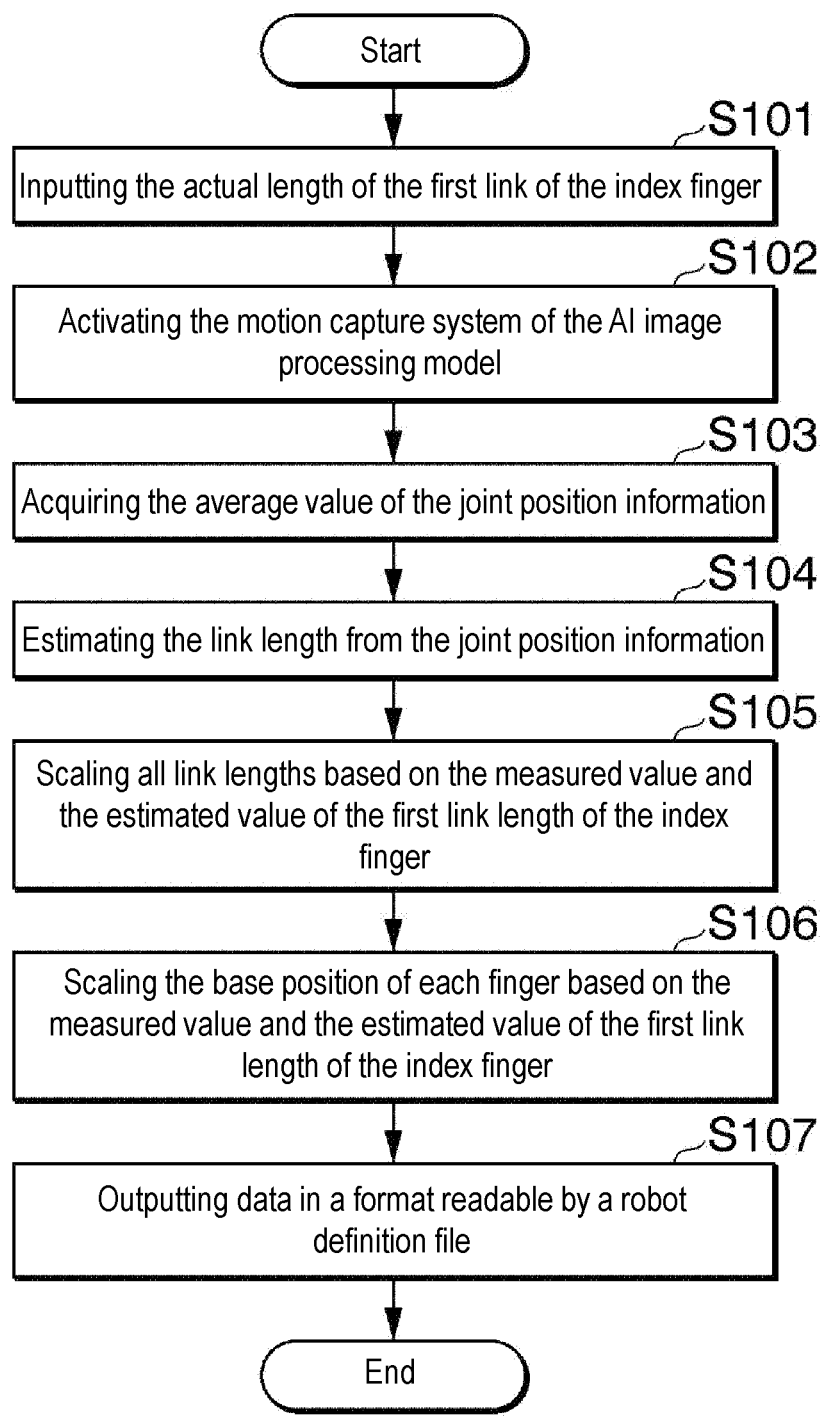
FIG. 15 is a flowchart of finger size measurement and model creation processing procedures according to the embodiment.

Next, an example of processing procedures performed by the imaging part 201, the finger size measurement part 202, the data creation part 203, and the model creation part 204 will be described. In addition, the processing is performed before remote operation. FIG. 15 is a flowchart of finger size measurement and model creation processing procedures according to this embodiment.

(Step S101) The operator inputs to the end effector control device 2 the actual length of the first link of the index finger of the remote-operating hand. In addition, the end effector control device 2 includes an input device (not shown) (for example, a keyboard or a touch panel sensor) and acquires input from the operator.

(Step S102) The end effector control device 2 activates the motion capture system using the trained hand image processing model. The imaging part 201 captures an image including the operator's hand.

(Step S103) The finger size measurement part 202 acquires the average value of the joint position information.

(Step S104) The finger size measurement part 202 estimates the length of each link from the joint position information.

(Step S105) The data creation part 203 scales all link lengths based on the input first link length of the index finger, the measured value, and the estimated value of each link.

(Step S106) The data creation part 203 scales the base position of each finger based on the input first link length of the index finger, the measured value, and the estimated value of each link.

(Step S107) The data creation part 203 creates data in a format readable by, for example, a robot definition file. The model creation part 204 creates a kinematics model based on the measured data.

Calibration Processing

Figure 16:
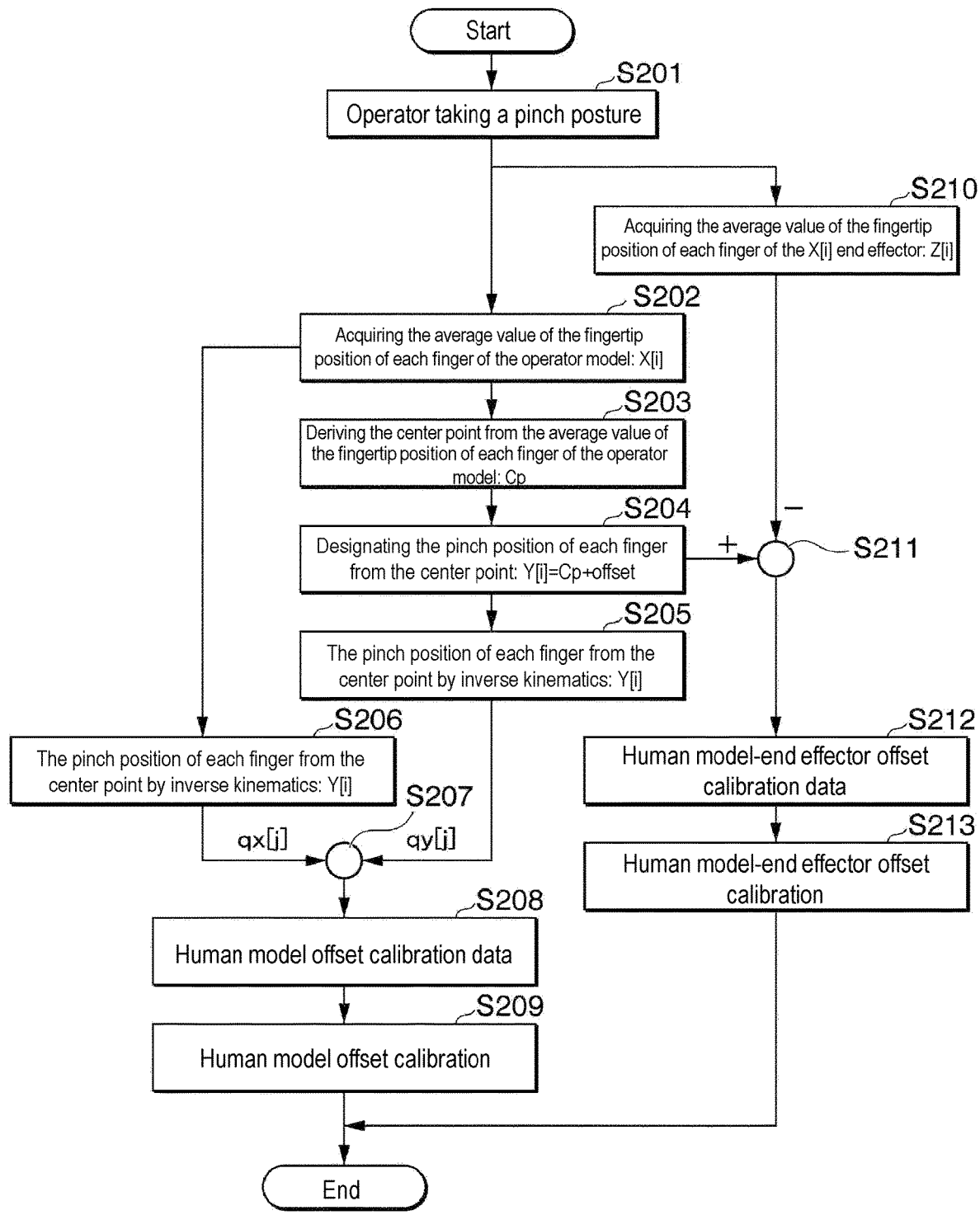
FIG. 16 is a diagram showing a processing procedure performed by the calibration part according to the embodiment.

Next, an example of a processing procedure performed by the calibration part 207 will be described. FIG. 16 is a diagram showing a processing procedure performed by the calibration part according to this embodiment. In addition, the following processing is an example in which the operator performs the pinch operation.

(Step S201) The sensor 31 of the data glove 3 detects a sensor value when the operator takes a pinch posture.

(Step S202) The calibration part 207 acquires the average value $X[i]$ of the fingertip position of each finger of the operator's hand model. In addition, the calibration part 207 performs, for example, the processing of steps S202 to S205 and the processing of step S206 in parallel. Further, the calibration part 207 performs, for example, the processing of steps S202 to S204 and the processing of step S210 in parallel.

(Step S203) The calibration part 207 derives the center point Cp from the average value of the fingertip position of each finger of the operator's hand model.

(Step S204) The calibration part 207 designates the pinch position of each finger from the center point Cp ($Y[i]=Cp+$ offset).

(Step S205) The calibration part 207 calculates the pinch position $qy[i]$ of each finger from the center point Cp by IK.

(Step S206) The calibration part 207 calculates the average value $qx[i]$ of the fingertip position of each finger by IK.

(Step S207) The calibration part 207 subtracts the average value $qx[i]$ of the fingertip position of each finger from the pinch position $qy[i]$ of each finger from the center point Cp.

(Step S208) The calibration part 207 creates the human model (operator model) offset calibration data using the data acquired by subtracting the average value $qx[i]$ of the fingertip position of each finger from the pinch position $qy[i]$ of each finger from the center point Cp.

(Step S209) The calibration part 207 performs the human model offset calibration using the created data. After the processing, the calibration part 207 ends the processing.

(Step S210) The calibration part 207 acquires the average value $Z[i]$ of the fingertip position of each finger of the end effector 1.

(Step S211) The calibration part 207 subtracts the average value $Z[i]$ of the fingertip position of each finger of the end effector 1 from the pinch position of each finger from the center point Cp. The human model-end effector offset calibration data corresponds to position data.

(Step S212) The calibration part 207 creates human model-end effector offset calibration data.

(Step S213) The calibration part 207 performs human model-end effector offset calibration using the created data. After the processing, the calibration part 207 ends the processing.

Processing Procedure of IK Processing Part

Figure 18:
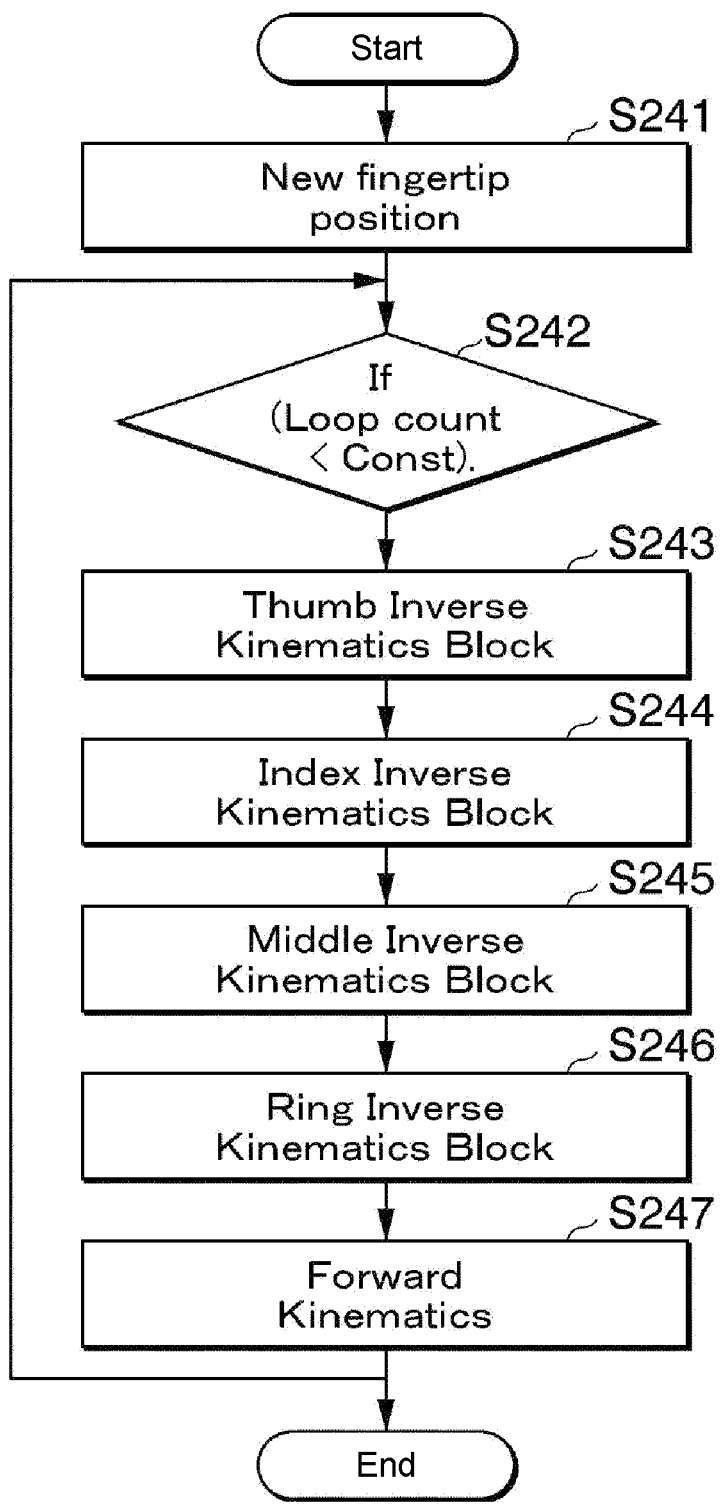
FIG. 18 is a flowchart of a processing procedure performed by the IK processing part according to the embodiment.
Figure 19:
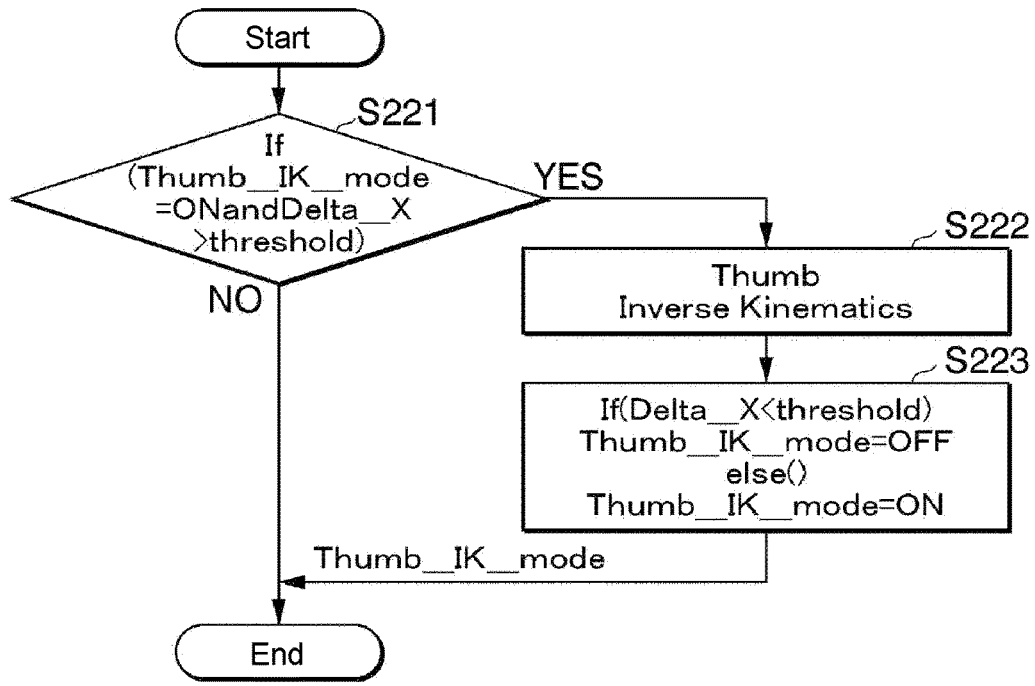
FIG. 19 is a flowchart of a processing procedure performed by the IK processing block according to the embodiment.

Next, an example of a processing procedure performed by the IK processing part 210 will be described with reference to FIGS. 17 to 19.

Figure 17:
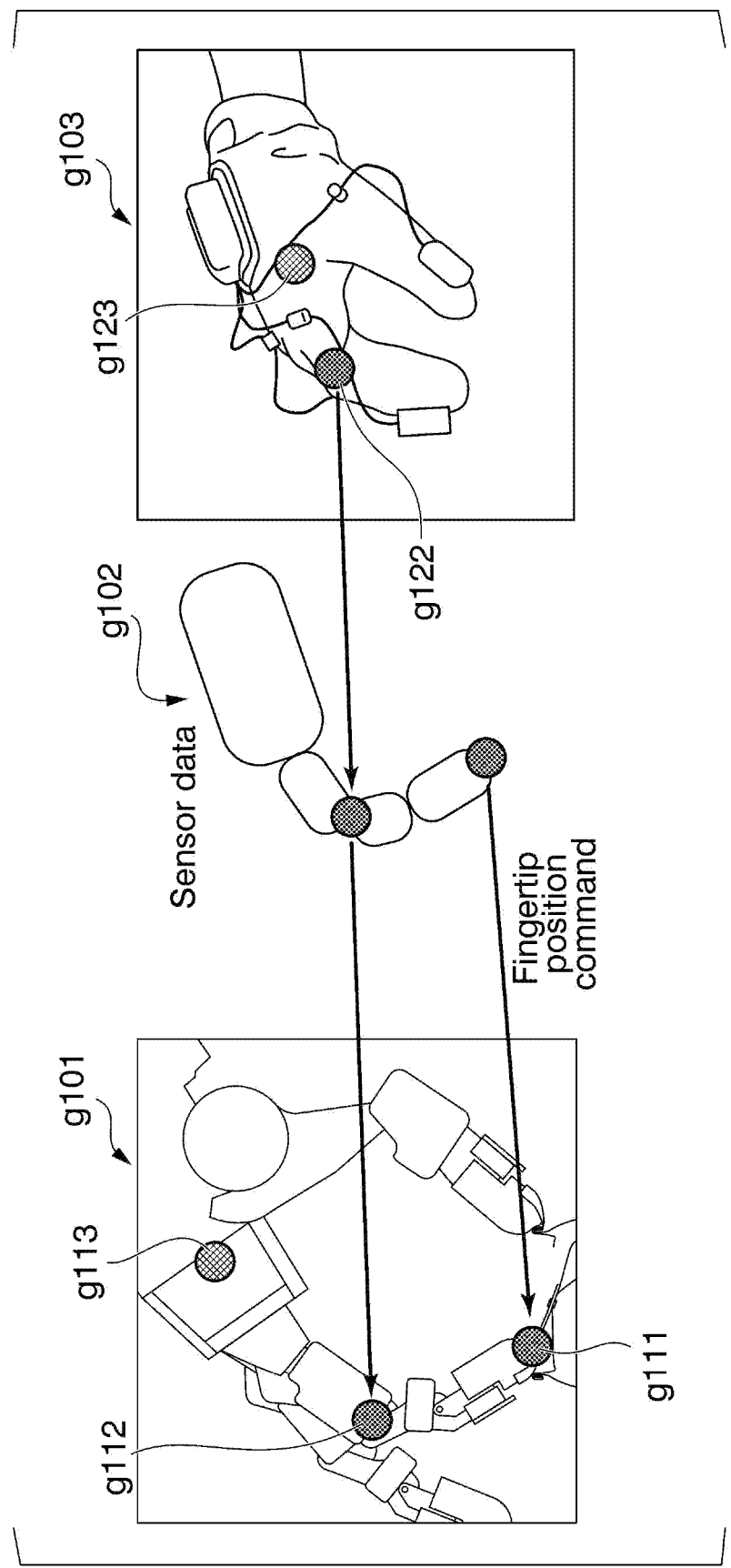
FIG. 17 is a diagram for illustrating the operation of pinching a pull tab by the end effector by remote control.

FIG. 17 is a diagram for illustrating the operation of pinching a pull tab by the end effector by remote control. Image g101 shows the fingertip position gill, the second joint position g112, and the MP joint position g113 of the finger 102 when the end effector 1 pinches the pull tab. Image g103 shows the second joint position g122 and the MP joint position g123 of the index finger when commanding the remote operation with the data glove. Image g102 shows the relationship between the position based on the sensor value of the end effector 1, the position based on the command value, and the like. In addition, as described above, the IK processing part 210 (operator joint angle information acquisition part) introduces, that is, acquires information on the joint angles of the operator's fingers by IK processing.

In addition, the following processing is an example in which the operator performs the pinch operation. The following processing example is an example in which the end effector 1 includes four fingers as shown in FIG. 14. FIG. 18 is a flowchart of a processing procedure performed by the IK processing part according to the embodiment.

(Step S241) The IK processing part 210 acquires the current fingertip position.

(Steps S242 to S247) The IK processing part 210 repeats the convergence calculations in steps S203 to S207 until the error between the target position and the current position of all fingers becomes smaller than the threshold. In addition, the IK processing part 210 ends the convergence calculation when the number of convergence calculations reaches the set value, and starts the convergence calculation for the next command value.

(Step S243) The IK processing part 210 performs processing of the IK processing block corresponding to the thumb.

(Step S244) The IK processing part 210 performs processing of the IK processing block corresponding to the index finger.

(Step S245) The IK processing part 210 performs processing of the IK processing block corresponding to the middle finger.

(Step S246) The IK processing part 210 performs processing of the IK processing block corresponding to the ring finger.

(Step S247) The IK processing part 210 performs FK processing.

Next, as an example of processing performed by the IK processing block, the processing of the IK processing block (S243 in FIG. 18) corresponding to the thumb will be described. FIG. 19 is a flowchart of a processing procedure performed by the IK processing block according to this embodiment.

(Step S221) The IK processing part 210 determines whether the thumb IK mode is on and whether the error X is greater than a threshold. If the thumb IK mode is on and the error X is greater than the threshold (step S221; YES), the IK processing part 210 proceeds to step S222. If the thumb IK mode is off or the error X is less than or equal to the threshold (step S221; NO), the IK processing part 210 skips the thumb IK processing and ends the processing. Thus, in this embodiment, IK calculation of a finger whose error from the target position is smaller than the threshold is skipped.

(Step S222) The IK processing part 210 performs IK processing corresponding to the thumb.

(Step S223) If the threshold is not greater than the error X and the thumb IK mode is not off, the IK processing part 210 turns on the thumb IK mode.

Figure 20:
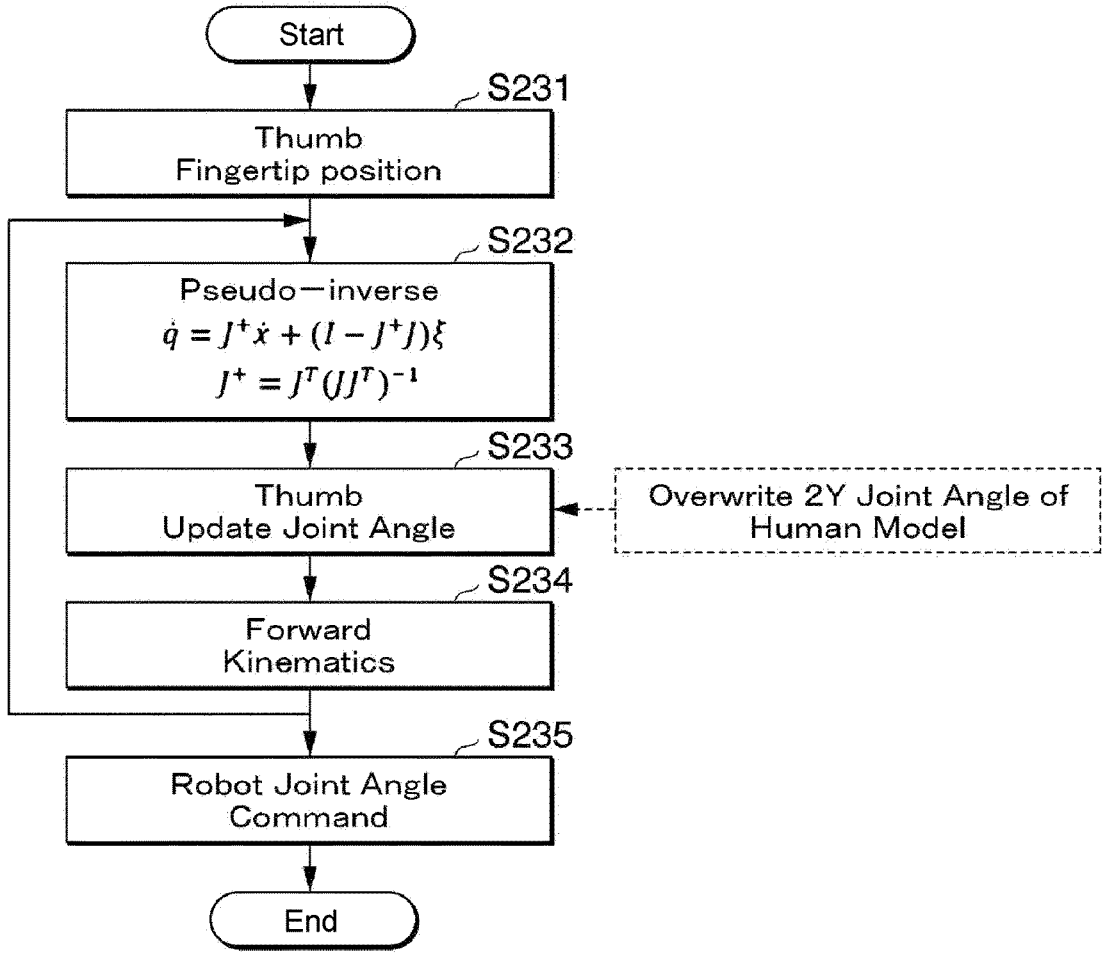
FIG. 20 is a flowchart of an IK processing procedure for the thumb according to the embodiment.

Next, the IK processing corresponding to the thumb in S222 of FIG. 19 will be described. FIG. 20 is a flowchart of an IK processing procedure for the thumb according to the embodiment.

(Step S231) The IK processing part 210 acquires the fingertip position of the thumb.

(Steps S232 to S234) The IK processing part 210 repeats the processing of steps S232-S234.

(Step S232) The IK processing part 210 performs pseudo inverse matrix calculations of equations (2) and (3).

(Step S233) The IK processing part 210 overwrites the value of the 2Y joint with the joint angle of the human model using the sensor value of the end effector 1.

(Step S234) The IK processing part 210 performs FK processing.

(Step S235) The IK processing part 210 creates a joint angle command for the end effector 1.

FK Processing

Next, an example of processing performed by the FK processing part 208 will be described.

Figure 21:
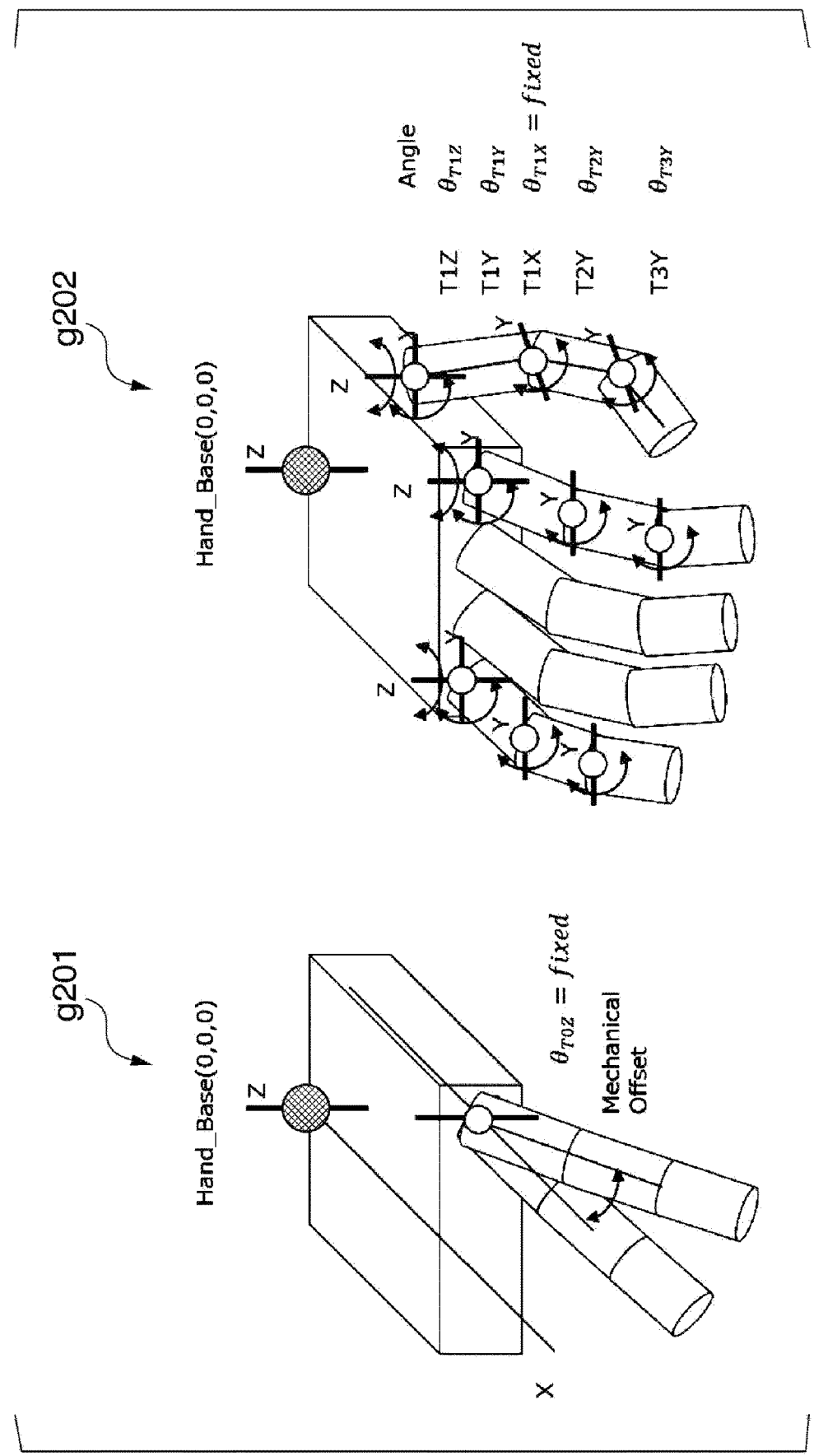
FIG. 21 is a diagram showing a coordinate system in FK processing.

FIG. 21 is a diagram showing a coordinate system in FK processing. Image g201 shows the x-axis direction, the z-axis direction, the reference point angle θr0z (=variable), and the mechanical offset. Image g202 shows the rotation direction of each joint and the angles between links (θr0z, θr0z, θr0x (=variable), θr2Y, θr3Y).

The co-rotation matrix is expressed by the following equation (4) for angle θ rotation about the x axis, the following equation (5) for angle θ rotation about the y axis, the following equation (6) for angle θ rotation about the z axis, the following equation (7) for the d translation about the x axis, the following equation (8) for the d translation about the y axis, and the following equation (9) for the d translation about the z axis.

[Equation 4]

$$\begin{bmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{bmatrix} \quad (4)$$

[Equation 5]

$$\begin{bmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{bmatrix} \quad (5)$$

[Equation 6]

$$\begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix} \quad (6)$$

[Equation 7]

$$\begin{bmatrix} 1 & 0 & 0 & d \\ 0 & 1 & 0 & 0 \\ 0 & 0 & 1 & 0 \\ 0 & 0 & 0 & 1 \end{bmatrix} \quad (7)$$

[Equation 8]

$$\begin{bmatrix} 1 & 0 & 0 & 0 \\ 0 & 1 & 0 & d \\ 0 & 0 & 1 & 0 \\ 0 & 0 & 0 & 1 \end{bmatrix} \quad (8)$$

[Equation 9]

$$\begin{bmatrix} 1 & 0 & 0 & 0 \\ 0 & 1 & 0 & 0 \\ 0 & 0 & 1 & d \\ 0 & 0 & 0 & 1 \end{bmatrix} \quad (9)$$

As an example of the transformation matrix used in the FK processing, the thumb will be described as an example.

The rotation matrix $T_{base}$ is the following equation (10); the rotation matrix $(T_{base})^{1Z}$ is the following equation (11); the rotation matrix $(T_{1Z})^{1Y}$ is the following equation (12); the matrix $(T_{1Y})^{1X}$ is the following equation (13); the matrix $(T_{1X})^{2Y}$ is the following equation (14); the rotation matrix $(T_{2Y})^{3Y}$ is the following equation (15); and the rotation matrix $(T_{3Y})^{Fingertip}$ is the following equation (16).

[Equation 10]

$$T_{base} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad (10)$$

-continued

[Equation 11]
$$T_{base}^{1Z} = \begin{bmatrix} \cos\theta_{roz} & -\sin\theta_{roz} & 0 & x_0 \\ \sin\theta_{roz} & \cos\theta_{roz} & 0 & y_0 \\ 0 & 0 & 1 & z_0 \\ 0 & 0 & 0 & 1 \end{bmatrix} \quad (11)$$

[Equation 12]
$$T_{1Z}^{1Y} = \begin{bmatrix} \cos\theta_{T1Z} & -\sin\theta_{T1Z} & 0 & 0 \\ \sin\theta_{T1Z} & \cos\theta_{T1Z} & 0 & 0 \\ 0 & 0 & 1 & 0 \\ 0 & 0 & 0 & 1 \end{bmatrix} \quad (12)$$

[Equation 13]
$$T_{1Y}^{1X} = \begin{bmatrix} \cos\theta_{T1Y} & 0 & -\sin\theta_{T1Y} & 0 \\ 0 & 1 & 0 & 0 \\ -\sin\theta_{T1Y} & 0 & \cos\theta_{T1Y} & 0 \\ 0 & 0 & 0 & 1 \end{bmatrix} \quad (13)$$

[Equation 14]
$$T_{1X}^{2Y} = \begin{bmatrix} 1 & 0 & 0 & x_{1Y/2Y} \\ 0 & \cos\theta_{T1X} & -\sin\theta_{T1X} & y_{1Y/2Y} \\ 0 & \sin\theta_{T1X} & \cos\theta_{T1X} & z_{1Y/2Y} \\ 0 & 0 & 0 & 1 \end{bmatrix} \quad (14)$$

[Equation 15]
$$T_{2Y}^{3Y} = \begin{bmatrix} \cos\theta_{T2Y} & 0 & \sin\theta_{T2Y} & x_{2Y/3Y} \\ 0 & 1 & 0 & y_{2Y/3Y} \\ -\sin\theta_{T2Y} & 0 & \cos\theta_{T2Y} & z_{2Y/3Y} \\ 0 & 0 & 0 & 1 \end{bmatrix} \quad (15)$$

[Equation 16]
$$T_{3Y}^{Fingertip} = \begin{bmatrix} \cos\theta_{T3Y} & 0 & \sin\theta_{T3Y} & x_{3Y/Fingertip} \\ 0 & 1 & 0 & y_{3Y/Fingertip} \\ -\sin\theta_{T3Y} & 0 & \cos\theta_{T3Y} & z_{3Y/Fingertip} \\ 0 & 0 & 0 & 1 \end{bmatrix} \quad (16)$$

Using the rotation matrices of the above equations (10) to (16), the equation for each fingertip from the reference point may be expressed as the following equation (17).

[Equation 17]
$$T_{base}^{Thumb\_Fingertip} = [T_{base}][T_{base}^{1Z}][T_{1Z}^{1Y}][T_{1Y}^{1X}][T_{1X}^{2Y}][T_{2Y}^{3Y}][T_{3Y}^{Thumb\_Fingertip}] \quad (17)$$

$$T_{base}^{Index\_Fingertip} = [T_{base}][T_{base}^{1Z}][T_{1Z}^{1Y}][T_{1Y}^{1X}][T_{1X}^{2Y}][T_{2Y}^{3Y}][T_{3Y}^{Index\_Fingertip}]$$

$$\vdots$$

$$T_{base}^{Pinky\_Fingertip} = [T_{base}][T_{base}^{1Z}][T_{1Z}^{1Y}][T_{1Y}^{1X}][T_{1X}^{2Y}][T_{2Y}^{3Y}][T_{3Y}^{Pinky\_Fingertip}]$$

Coordinate Origin of Human Model and Coordinate Origin of End Effector

Here, as shown in FIGS. 22 to 25, the coordinate origin of the human model and the coordinate origin of the robot do not match.

Figure 22:
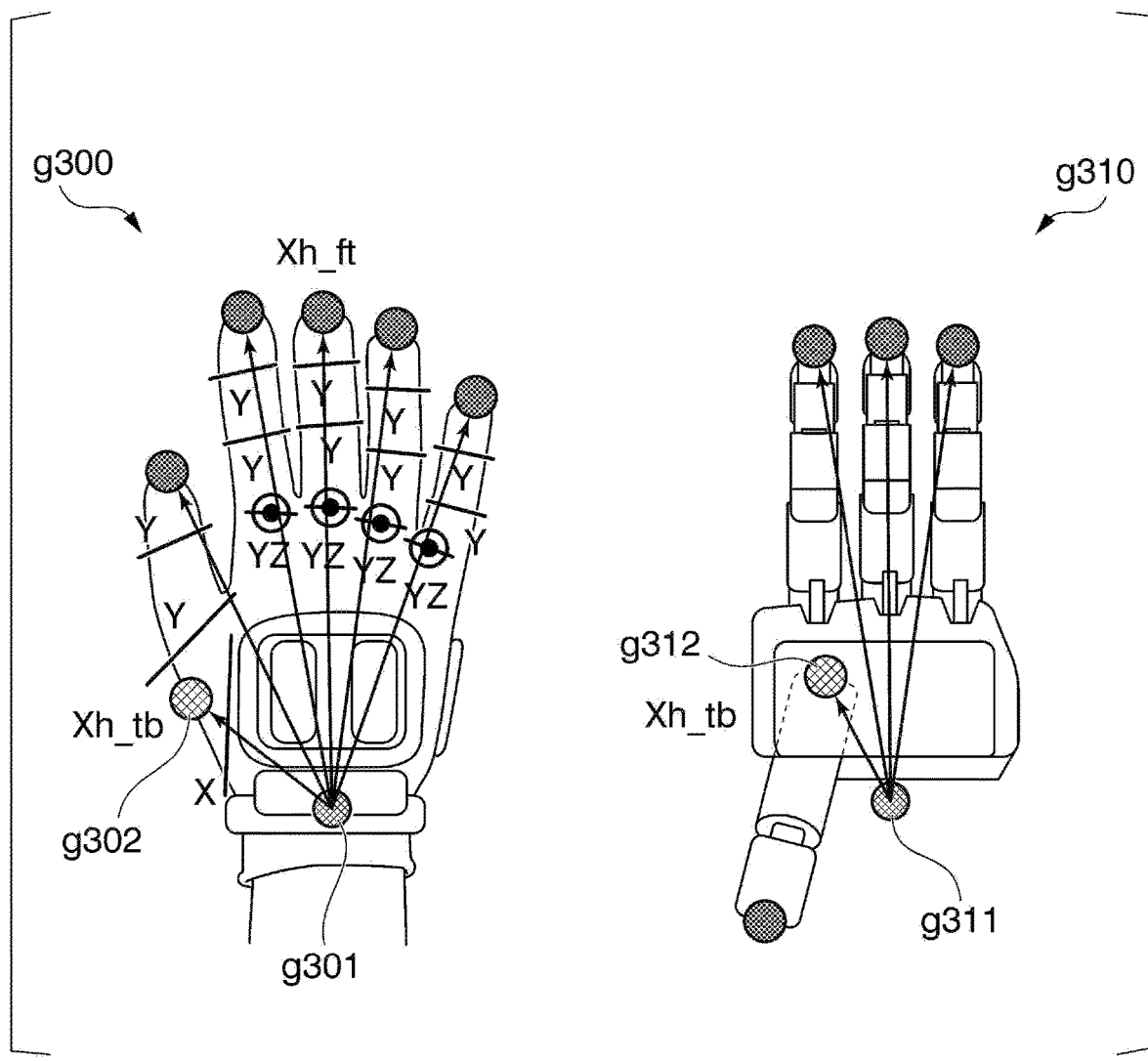
FIG. 22 is a diagram showing a reference point and a thumb base position of a human model, and a reference point and a thumb base position in the robot coordinates.

FIG. 22 is a diagram showing a reference point and a thumb base position of a human model, and a reference point and a thumb base position in the robot coordinates.

Image g300 shows a reference point (origin) g301 of the hand coordinate system of the human model, a base position (Xh_tb) g302 of the base position of the thumb viewed from the reference point of the hand coordinate system of the human model, and a fingertip position (Xh_ft) g303 of each finger viewed from the reference point of the hand coordinate system of the human model.

Image g310 shows the reference point (origin) g311 of the robot coordinate system of the end effector 1, the base position (Xr_tb) g312 of the base position of the thumb viewed from the reference point of the robot coordinate system of the end effector 1, and the fingertip position (Xr_ft) g313 of each finger viewed from the reference point of the robot coordinate system of the end effector 1.

When the fingertip position of the human model viewed from the coordinate origin of the human model is indicated to the end effector 1, the posture of the finger of the end effector 1 may differ greatly from that of the human.

For example, when the operator performs a natural pinch operation, the pinch position of the end effector 1 is either too close or too far from the palm and cannot take a proper posture.

Figure 23:
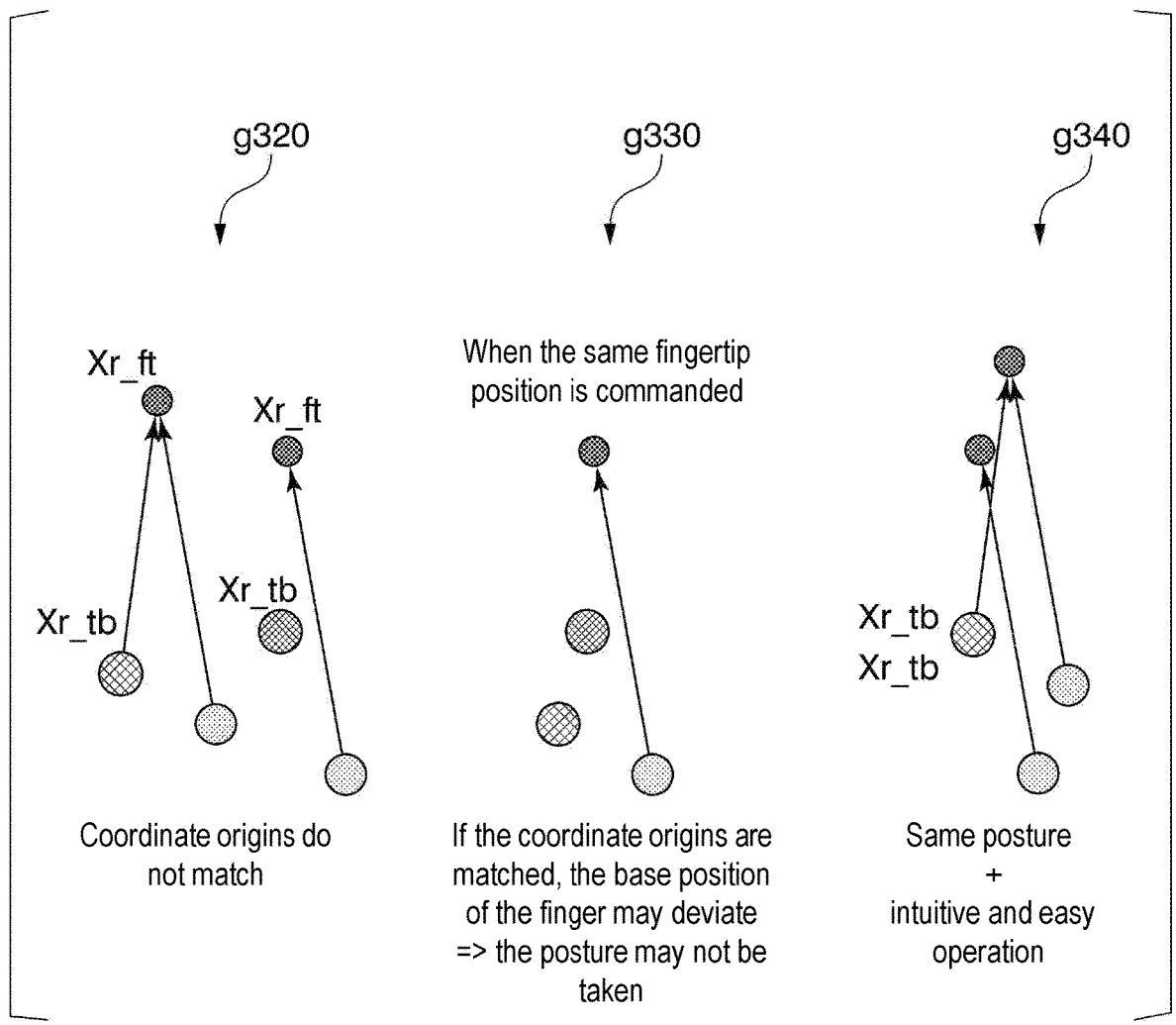
FIG. 23 is a diagram for illustrating the relationship between the reference point and the thumb base position of the human model, and the reference point and the thumb base position in the robot coordinates.

For example, as shown in image g320 in FIG. 23, if the same fingertip position is commanded, the reference points of the coordinate systems do not match. Further, as shown in image g330 of FIG. 23, when the same fingertip position is commanded, if the reference points of the coordinate systems are matched, the base position of the finger may deviate, and the posture may not be taken. FIG. 23 is a diagram for illustrating the relationship between the reference point and the thumb base position of the human model, and the reference point and the thumb base position in the robot coordinates.

From the viewpoint of performing an operation with the fingertips, it is better to match the base of the finger of the person and the end effector 1 for better workability and less strain on the posture.

That is, considering that the movements and postures of the thumb and index finger are dominant when a person performs fine operations, it is more effective to match the bases of the thumbs or index fingers of the human and the robot.

In addition, generally, the tip of the index finger may be greatly bent toward the base of the thumb, and the thumb cannot move as far forward as the index finger.

Therefore, in this embodiment, the base positions of the thumbs of the human model and the end effector 1 are made to match. In this embodiment, for example, as shown in image g340 of FIG. 23, by correcting the command value so that the bases of the thumbs match, the same posture may be obtained, enabling intuitive operation.

In addition, the fingertip position (Xr_ft) of each finger viewed from the reference point of the hand coordinate system of the end effector 1 may be acquired by the following equation (18).

$$Xr\_ft = (Xr\_tb - Xh)tb) + Xh\_fh \quad \text{[Equation 18]}$$

Figure 24:
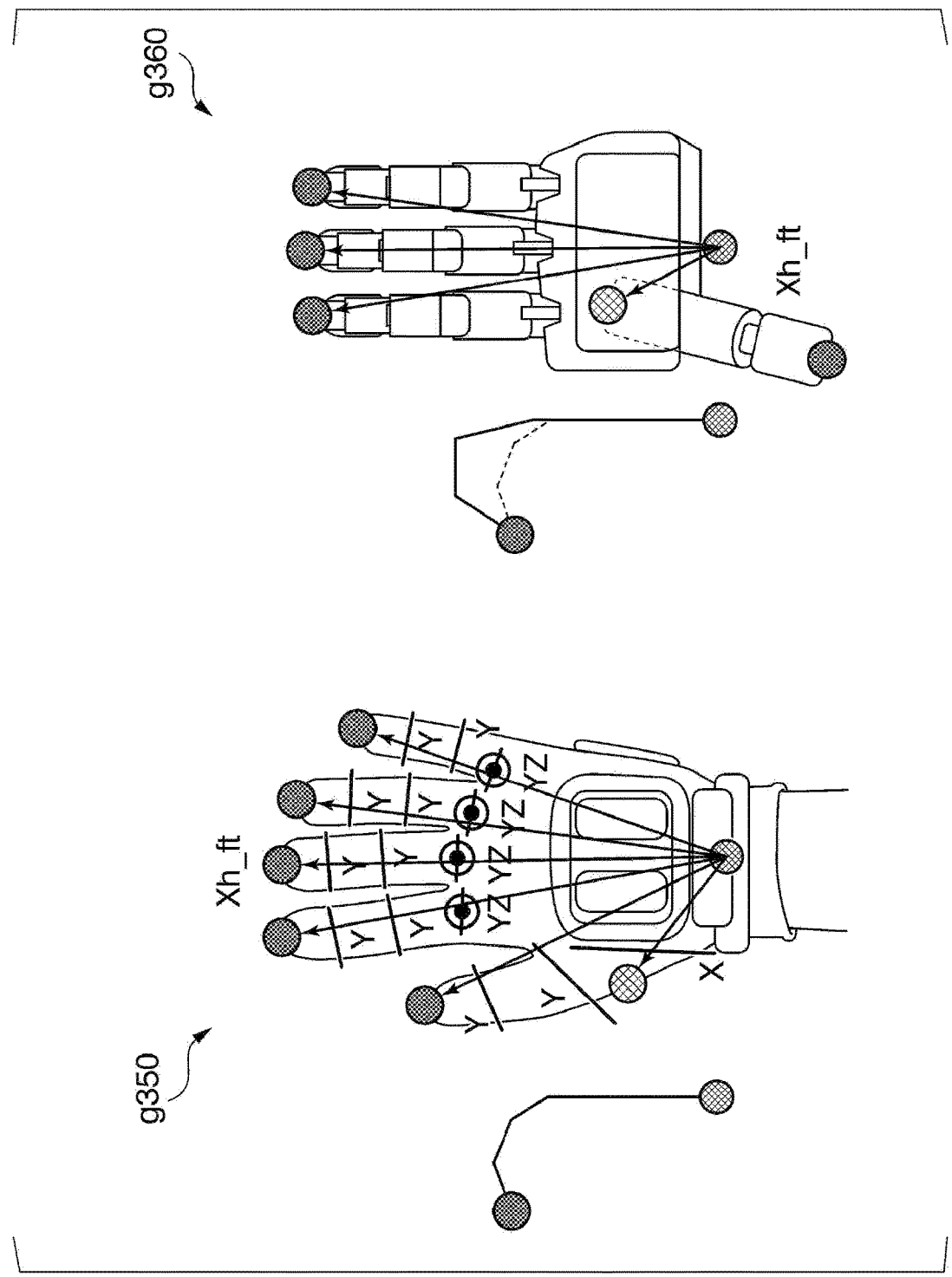
FIG. 24 is a diagram showing an example of transition of links to fingertips when the base positions of the thumbs are matched.
Figure 25:
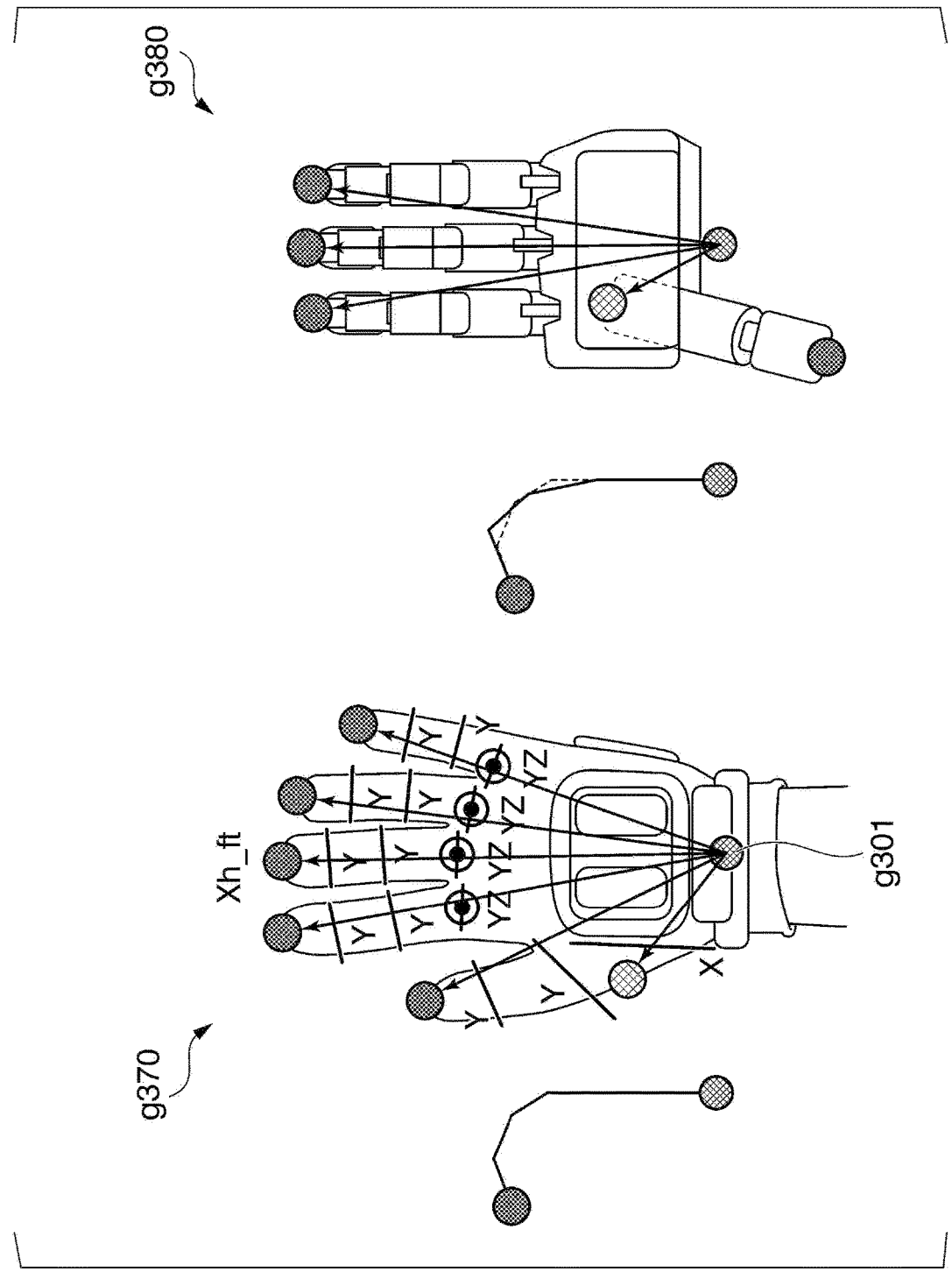
FIG. 25 is a diagram showing an example of transition of links to fingertips when the base positions of the thumbs are matched.

FIGS. 24 and 25 are diagrams showing an example of transition of links to fingertips when the base positions of the thumbs are matched. In FIGS. 24 and 25, the chronological order is the order of images g350, g360, g370, and g380.

In addition, the transition diagrams shown in FIGS. 24 and 25 are examples, and the disclosure is not limited thereto.

As described above, in this embodiment, the following processing is performed.

Building a finger kinematics model for each operator by building a system that measures the finger size of the operator.

Building an algorithm for retargeting by IK, and building an algorithm that transforms a human fingertip position command to a robot fingertip position in the task space.

Correcting a fingertip position error caused by a difference between robot and human models using a calibration algorithm.

Making the joint angle command mode by IK and the joint angle command mode by device selectable for each finger based on the taxonomy in order to allow the operator to intuitively operate the robot multi-fingered hand and to reduce the IK calculational load.

Overwriting the angle command value of the second joint in the IK convergence calculation result of each joint with the direct angle information detected by the device in order to allow the operator to intuitively operate the robot multi-fingered hand and to reduce the IK calculational load.

Thereby, according to this embodiment, the following effects may be obtained.

By building a system to measure the finger size of an operator, it becomes possible to build a detailed finger kinematics model for each operator.

By building an algorithm for retargeting by IK and building an algorithm that transforms a human fingertip position command to a robot fingertip position in the task space, it becomes possible to indicate each fingertip position accurately even if the mechanisms and sizes differ between humans and robots.

Even if there is an error in the fingertip position caused by the difference between the robot and human models, by performing calibration with the operator's pinch posture, it becomes possible to reset the positional deviation when the robot's pinch posture is commanded.

By making the joint angle command mode by IK and the joint angle command mode by device selectable for each finger based on the taxonomy, it becomes possible for the operator to intuitively operate the robot multi-fingered hand.

By making the joint angle command mode by IK and the joint angle command mode by device selectable for each finger based on the taxonomy, it becomes possible to reduce the IK calculational load.

By overwriting the angle command value of the second joint in the IK convergence calculation result of each joint with the direct angle information detected by the device, it becomes possible to obtain the effect of speeding up the IK convergence calculation.

By defining that the movement, speed, acceleration and deceleration of the second joint are dominant to the effect of intuitive finger movement and overwriting the angle command value of the second joint in the IK convergence calculation result of each joint with the direct angle information detected by the device, it becomes possible for the operator to intuitively command the joint angles of the multi-fingered hand.

A program for realizing all or a part of the functions of the end effector control device 2 of the disclosure may be recorded on a computer-readable recording medium, and the program recorded on this recording medium may be read by a computer system, and all or a part of the processing performed by the end effector control device 2 may be performed by executing the program. In addition, the "computer system" referred to here includes hardware such as an OS and peripheral devices. Further, the "computer system" includes a WWW system provided with a home page providing environment (or display environment). The term "computer-readable recording medium" refers to portable media such as flexible discs, magneto-optical discs, ROMs and CD-ROMs, and storage devices such as hard discs incorporated in computer systems. In addition, "computer-readable recording medium" includes things that hold the program for a certain period of time, like a volatile memory (RAM) inside a computer system that acts as a server or client when a program is transmitted via a network such as the Internet or a communication line such as a telephone line.

Further, the above program may be transmitted from a computer system storing this program in a storage device or the like to another computer system via a transmission medium or by a transmission wave in a transmission medium. Here, the "transmission medium" for transmitting the program refers to a medium having a function of transmitting information, such as a network (communication network) such as the Internet or a communication line (communication line) such as a telephone line. Further, the program may be for realizing a part of the functions described above. Further, it may be a so-called difference file (difference program) that may realize the above-described functions in combination with a program already recorded in the computer system.

Although the modes for implementing the disclosure have been described above using the embodiments, the disclosure is not limited to these embodiments, and various modifications and replacements may be made without departing from the gist of the disclosure.

What is claimed is:

1. A remote control system in which an operator remotely operates an end effector comprising a finger, the remote control system comprising:
    a coordinate origin setting part for setting coordinate origins of the operator and the end effector;
    an operator joint angle information acquisition part for acquiring information on a joint angle of a finger of the operator;
    an operator finger length measurement part for measuring a length of each link of the finger of the operator;
    an operator fingertip position calculation part for calculating a tip position of each finger of the operator viewed from a local coordinate origin of an operator model to be a fingertip position of the operator from information acquired by the operator joint angle information acquisition part and the operator finger length measurement part; and
    an end effector joint angle derivation part for deriving a joint angle of the end effector from the fingertip position of the operator and a local coordinate origin of the end effector by inverse kinematics.

2. The remote control system according to claim 1, wherein the operator finger length measurement part models a geometric structure of a joint position and a link length of the operator, and measures the joint position and a length of each link of the finger of the operator with a length of a first link of one of five fingers of the operator as a reference.

3. The remote control system according to claim 2, wherein the end effector joint angle derivation part creates a command value for a second joint of the finger of the end effector based on the measured length of each link of the operator and the calculated fingertip position of the operator.

4. The remote control system according to claim 3, further comprising:
    a position correction part which measures a positional difference between a center point of the fingertip of the operator and a center point of the finger of the end effector and corrects the tip position of each finger viewed from the local coordinate origin of the operator model as an offset of a fingertip position command.

5. The remote control system according to claim 3, further comprising:
a position correction part which measures a positional difference between a target point of the fingertip of the operator and a fingertip of a model of a hand of the operator and corrects the tip position of each finger viewed from the local coordinate origin of the operator model as an offset of a fingertip position command.

6. The remote control system according to claim 3, further comprising:
a position correction part which measures a positional difference between a target point of the fingertip of the operator and a target point of the finger of the end effector and corrects the tip position of each finger viewed from the local coordinate origin of the operator model as an offset of a fingertip position command.

7. The remote control system according to claim 2, further comprising:
a position correction part which measures a positional difference between a center point of the fingertip of the operator and a center point of the finger of the end effector and corrects the tip position of each finger viewed from the local coordinate origin of the operator model as an offset of a fingertip position command.

8. The remote control system according to claim 2, further comprising:
a position correction part which measures a positional difference between a target point of the fingertip of the operator and a fingertip of a model of a hand of the operator and corrects the tip position of each finger viewed from the local coordinate origin of the operator model as an offset of a fingertip position command.

9. The remote control system according to claim 2, further comprising:
a position correction part which measures a positional difference between a target point of the fingertip of the operator and a target point of the finger of the end effector and corrects the tip position of each finger viewed from the local coordinate origin of the operator model as an offset of a fingertip position command.

10. The remote control system according to claim 2, further comprising:
a mode for deriving the joint angle of the end effector; and
a mode selection part capable of estimating a posture of a hand of the operator based on sensor information of a robot equipped with the end effector and selecting a mode for moving the robot for each finger.

11. The remote control system according to claim 1, wherein the end effector joint angle derivation part creates a command value for a second joint of the finger of the end effector based on the measured length of each link of the operator and the calculated fingertip position of the operator.

12. The remote control system according to claim 11, further comprising:
a position correction part which measures a positional difference between a center point of the fingertip of the operator and a center point of the finger of the end effector and corrects the tip position of each finger viewed from the local coordinate origin of the operator model as an offset of a fingertip position command.

13. The remote control system according to claim 11, further comprising:
a position correction part which measures a positional difference between a target point of the fingertip of the operator and a fingertip of a model of a hand of the operator and corrects the tip position of each finger viewed from the local coordinate origin of the operator model as an offset of a fingertip position command.

14. The remote control system according to claim 11, further comprising:
a position correction part which measures a positional difference between a target point of the fingertip of the operator and a target point of the finger of the end effector and corrects the tip position of each finger viewed from the local coordinate origin of the operator model as an offset of a fingertip position command.

15. The remote control system according to claim 11, further comprising:
a mode for deriving the joint angle of the end effector; and
a mode selection part capable of estimating a posture of a hand of the operator based on sensor information of a robot equipped with the end effector and selecting a mode for moving the robot for each finger.

16. The remote control system according to claim 1, further comprising:
a position correction part which measures a positional difference between a center point of the fingertip of the operator and a center point of the finger of the end effector and corrects the tip position of each finger viewed from the local coordinate origin of the operator model as an offset of a fingertip position command.

17. The remote control system according to claim 1, further comprising:
a position correction part which measures a positional difference between a target point of the fingertip of the operator and a fingertip of a model of a hand of the operator and corrects the tip position of each finger viewed from the local coordinate origin of the operator model as an offset of a fingertip position command.

18. The remote control system according to claim 1, further comprising:
a position correction part which measures a positional difference between a target point of the fingertip of the operator and a target point of the finger of the end effector and corrects the tip position of each finger viewed from the local coordinate origin of the operator model as an offset of a fingertip position command.

19. The remote control system according to claim 1, further comprising:
a mode for deriving the joint angle of the end effector; and
a mode selection part capable of estimating a posture of a hand of the operator based on sensor information of a robot equipped with the end effector and selecting a mode for moving the robot for each finger.

20. The remote control system according to claim 19, wherein the mode selection part switches modes according to a taxonomy, or switches modes according to a speed of the fingertip of the operator.

* * * * *